United States Patent
Ji et al.

(10) Patent No.: US 12,021,774 B2
(45) Date of Patent: Jun. 25, 2024

(54) METHOD AND DEVICE FOR TRANSMITTING AND RECEIVING REFERENCE SIGNAL IN MILLIMETER WAVE WIRELESS COMMUNICATION SYSTEM

(71) Applicant: Samsung Electronics Co., Ltd., Suwon-si (KR)

(72) Inventors: Hyoungju Ji, Suwon-si (KR); Younsun Kim, Suwon-si (KR); Heecheol Yang, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 17/310,639

(22) PCT Filed: Feb. 17, 2020

(86) PCT No.: PCT/KR2020/002202
§ 371 (c)(1),
(2) Date: Aug. 13, 2021

(87) PCT Pub. No.: WO2020/167081
PCT Pub. Date: Aug. 20, 2020

(65) Prior Publication Data
US 2022/0103318 A1    Mar. 31, 2022

(30) Foreign Application Priority Data

Feb. 15, 2019 (KR) .................. 10-2019-0017970
Feb. 14, 2020 (KR) .................. 10-2020-0018577

(51) Int. Cl.
*H04L 5/00* (2006.01)
(52) U.S. Cl.
CPC ................ *H04L 5/0048* (2013.01)

(58) Field of Classification Search
None
See application file for complete search history.

(56) References Cited

U.S. PATENT DOCUMENTS 10,064,169 B2   8/2018   Bai et al.
10,069,550 B2   9/2018   Jeong et al.
(Continued)

FOREIGN PATENT DOCUMENTS

EP        3373673 A1     9/2018
KR    10-2014-0005895 A  1/2014
(Continued)

OTHER PUBLICATIONS

International Search Report and Written Opinion of the International Searching Authority in connection with International Application No. PCT/KR2020/002202 dated May 21, 2020, 9 pages.
(Continued)

*Primary Examiner* — Brian S Roberts

(57) ABSTRACT

The disclosure relates to a method and device for communication between a base station (BS) and a user equipment (UE) in a millimeter wave wireless communication system. An operating method of a BS in a wireless communication system according to an embodiment may include: transmitting, via higher layer signaling, one or more reference signal configurations to a UE so as to transmit a reference signal by using a single carrier; transmitting, to the UE, information about a reference signal configuration to be used for the UE from among the one or more reference signal configurations, via at least one of the higher layer signaling, a physical downlink control channel (PDCCH), or a media access control control element (MAC CE); and transmitting, to the UE, the reference signal via a data channel, based on the information about the reference signal configuration to be used for the UE.

15 Claims, 22 Drawing Sheets

(56) References Cited

U.S. PATENT DOCUMENTS

| | | | |
|---|---|---|---|
| 10,142,074 B2 | 11/2018 | Wang et al. | |
| 2013/0287064 A1* | 10/2013 | Seo | H04L 5/0051 |
| | | | 375/144 |
| 2015/0003388 A1* | 1/2015 | Mazzarese | H04L 25/0226 |
| | | | 370/329 |
| 2017/0201967 A1 | 7/2017 | Yang et al. | |
| 2017/0257864 A1 | 9/2017 | Kakishima et al. | |
| 2017/0302346 A1 | 10/2017 | Jeong et al. | |
| 2018/0145809 A1 | 5/2018 | Kwak et al. | |
| 2018/0176788 A1 | 6/2018 | Yeo et al. | |
| 2018/0331799 A1 | 11/2018 | Zhang et al. | |
| 2019/0356448 A1* | 11/2019 | Li | H04L 5/0094 |

FOREIGN PATENT DOCUMENTS

| | | |
|---|---|---|
| KR | 10-2016-0041025 A | 4/2016 |
| KR | 10-2016-0149082 A | 12/2016 |
| KR | 10-2018-0057467 A | 5/2018 |
| WO | 2018098802 A1 | 6/2018 |

OTHER PUBLICATIONS

European Patent Office, "Supplementary European Search Report" dated Feb. 18, 2022, in connection with European Patent Application No. 20756323.0, 7 pages.

NTT DOCOMO et al., "WF on DM-RS," 3GPP TSG RAN WG1 Meeting #88bis, R1-1706508, Spokane, USA, Apr. 3-7, 2017, 2 pages.

Translation of the Written Opinion of the International Searching Authority in connection with International Application No. PCT/KR2020/002202 dated May 21, 2020, 8 pages.

Communication pursuant to Article 94(3) EPC dated Nov. 9, 2023, in connection with European Patent Application No. 20756323.0, 6 pages.

* cited by examiner

METHOD AND DEVICE FOR TRANSMITTING AND RECEIVING REFERENCE SIGNAL IN MILLIMETER WAVE WIRELESS COMMUNICATION SYSTEM

CROSS-REFERENCE TO RELATED APPLICATIONS

This application is a 371 of International Application No. PCT/KR2020/002202, filed Feb. 17, 2020, which claims priority to Korean Patent Application No. 10-2019-0017970, filed Feb. 15, 2019, and Korean Patent Application No. 10-2020-0018577, filed Feb. 14, 2020, the disclosures of which are herein incorporated by reference in their entirety.

BACKGROUND

1. Field

The disclosure relates to a method and device for communication between a base station (BS) and a user equipment (UE) in a millimeter wave wireless communication system, and more particularly, to a method and device for transmitting a reference signal when a BS transmits data by using single carrier to a plurality of multiplexed UEs. The disclosure also relates to ac method and device, by which a BS can measure a channel via a reference signal by using single carrier.

2. Description of Related Art

To meet increasing demand with respect to wireless data traffic after the commercialization of $4^{th}$ generation (4G) communication systems, efforts have been made to develop evolved 5th generation (5G) system or pre-5G communication system. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. To improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply the 5G communication system to the IoT network. For example, sensor networks, M2M communication, MTC, or the like are being implemented by using the 5G communication techniques including beamforming, MIMO, array antennas, or the like. Application of cloud radio access network (Cloud-RAN) as the above-described big data processing technology may be an example of convergence of 5G communication technology and IoT technology.

Mobile communication systems are developed to provide communication and simultaneously to ensure mobility of a user. With rapid technological development, such mobile communication systems have reached a level at which not only voice communication but also a high-speed data communication system can be provided. Recently, the $3^{rd}$ Generation Partnership Project (3GPP) performs standardization tasks on a new radio (NR) system as one of next-generation mobile communication systems. The NR system is being developed to meet various network requirements and achieve a goal of broad performance, and in particular, refers to a technology including implementation of communication in a millimeter wave band. Hereinafter, the NR system may be understood as a concept including not only a millimeter wave band equal to or greater than 6 GHz but also including a 5G NR system, a 4G LTE system, and an LTE-Advanced (LTE-A) system.

SUMMARY

A disclosed embodiment may provide a method and device for transmitting a reference signal in a millimeter wave wireless communication system.

An operating method of a base station (BS) in a millimeter wave wireless communication system according to an embodiment may include: transmitting, via higher layer signaling, one or more reference signal configurations to a user equipment (UE) so as to transmit a reference signal by using a single carrier; transmitting, to the UE, information about a reference signal configuration to be used for the UE from among the one or more reference signal configurations, via at least one of the higher layer signaling, a physical downlink control channel (PDCCH), or a media access control control element (MAC CE); and transmitting, to the UE, the reference signal via a data channel, based on the information about the reference signal configuration to be used for the UE.

According to an embodiment, provided are a method and device for transmitting a reference signal in a millimeter wave wireless communication system.

DETAILED DESCRIPTION

Figure 1A:
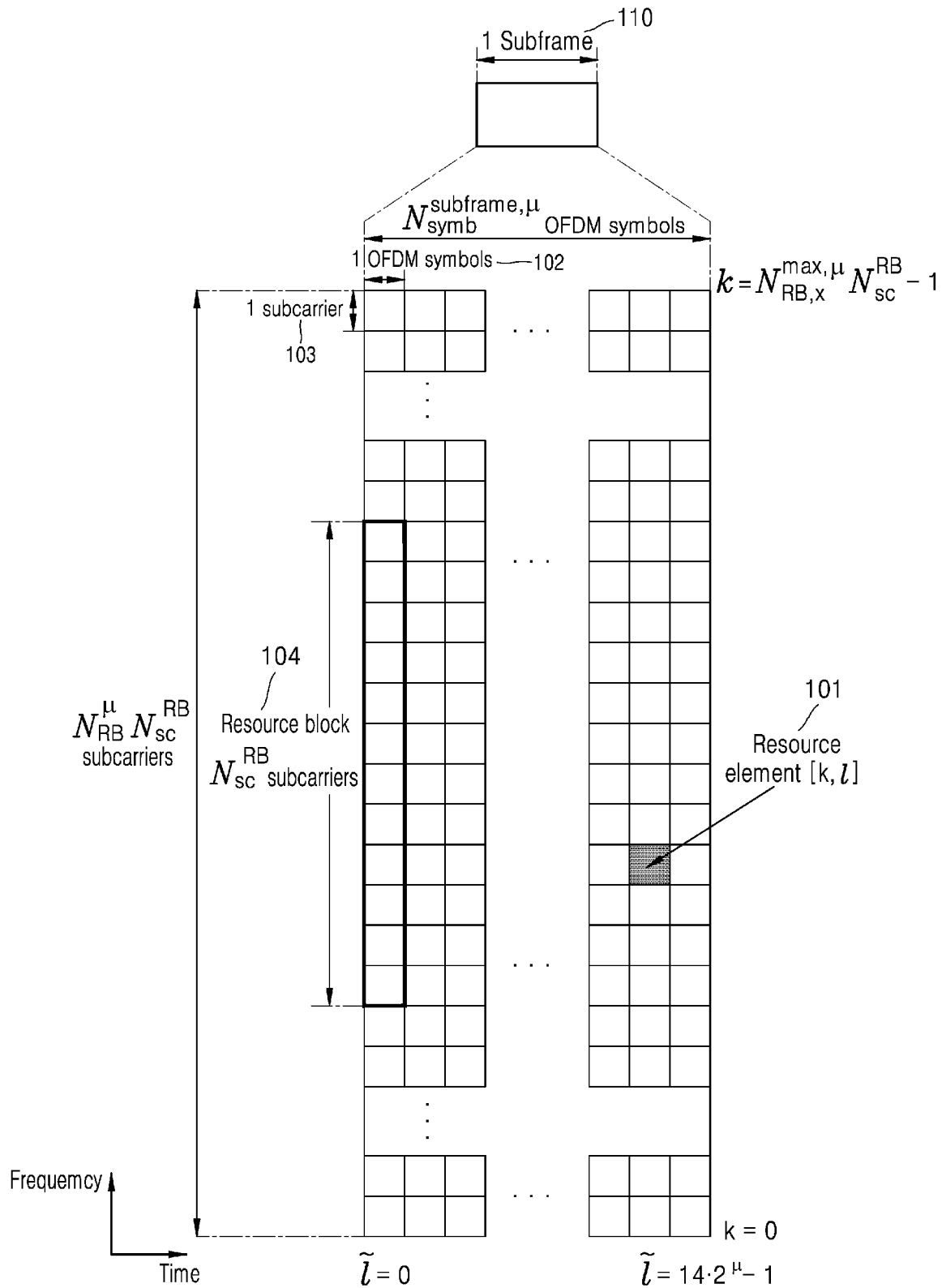
FIG. 1A is a diagram illustrating a structure of a time-frequency domain that is a resource region of a new radio (NR) system.

According to an embodiment of the disclosure, an operating method of a base station (BS) in a wireless communication system may include: transmitting, via higher layer signaling, one or more reference signal configurations to a user equipment (UE) so as to transmit a reference signal by using a single carrier; transmitting, to the UE, information about a reference signal configuration to be used for the UE from among the one or more reference signal configurations, via at least one of the higher layer signaling, a physical downlink control channel (PDCCH), or a media access control control element (MAC CE); and transmitting, to the UE, the reference signal via a data channel, based on the information about the reference signal configuration to be used for the UE.

In an embodiment, the one or more reference signal configurations may include a reference signal configuration for at least one method from among a first reference signal transmitting method of configuring a subcarrier spacing used in transmission of the reference signal to be different from a subcarrier spacing used in transmission of the data channel, a second reference signal transmitting method of transmitting a reference signal on which discrete Fourier transform (DFT) precoding is performed or a reference signal on which sample multiplexing is performed, based on a transmission bandwidth of the data channel, or a third reference signal transmitting method of transmitting the reference signal by using a single carrier having a bandwidth equal to or greater than a bandwidth of a plurality of single carriers when a plurality of data channels respectively corresponding to the plurality of single carriers are transmitted by using the plurality of single carriers.

In an embodiment, the one or more reference signal configurations may include a reference signal configuration for at least one method from among a fourth reference signal transmitting method of transmitting the reference signal in a first band including a plurality of bands for transmitting respective data channels to a plurality of UEs, or a fifth reference signal transmitting method of transmitting a data channel by using a second band, and transmitting the reference signal in bands divided from the second band.

In an embodiment, the transmitting, via the data channel, of the one or more reference signal configurations to the UE so as to transmit the reference signal may include determining a reference signal configuration, based on at least one of the number of single carrier bands, a channel quality, whether transmission of the data channel is succeeded, or the number of UEs to which the data channel is to be transmitted.

In an embodiment, the transmitting, to the UE, of the information about the reference signal configuration to be used for the UE from among the one or more reference signal configurations may include determining the reference signal configuration to be used for the UE, based on at least one of a reference signal received power (RSRP), a signal-to-noise ratio (SNR), or a rank, or determining to use a preset reference signal configuration.

According to an embodiment of the disclosure, an operating method of a user equipment (UE) in a wireless communication system may include: receiving, via higher layer signaling, one or more reference signal configurations from a base station (BS) so as to transmit a reference signal by using a single carrier; receiving, from the BS, information about a reference signal configuration to be used for the UE from among the one or more reference signal configurations, via at least one of the higher layer signaling, a physical downlink control channel (PDCCH), or a media access control control element (MAC CE); and receiving, from the BS, the reference signal via a data channel, based on the information about the reference signal configuration to be used for the UE.

In an embodiment, the one or more reference signal configurations may include a reference signal configuration for at least one method from among a first reference signal receiving method of configuring a subcarrier spacing used in reception of the reference signal to be different from a subcarrier spacing used in reception of the data channel, a second reference signal receiving method of receiving a reference signal on which discrete Fourier transform (DFT) precoding is performed or a reference signal on which sample multiplexing is performed, based on a transmission bandwidth of the data channel, or a third reference signal receiving method of receiving the reference signal by using a single carrier having a bandwidth equal to or greater than a bandwidth of a plurality of single carriers when a plurality of data channels respectively corresponding to the plurality of single carriers are received by using the plurality of single carriers.

In an embodiment, the one or more reference signal configurations may include a reference signal configuration for at least one method from among a fourth reference signal receiving method of receiving the reference signal in a first band including a plurality of bands for receiving respective data channels by a plurality of UEs, or a fifth reference signal receiving method of receiving a data channel by using a second band, and receiving the reference signal in bands divided from the second band.

In an embodiment, the transmitting, via the data channel, of the one or more reference signal configurations to the UE so as to receive the reference signal may include determining a reference signal configuration, based on at least one of the number of single carrier bands, a channel quality, whether transmission of the data channel is succeeded, or the number of UEs to which the data channel is to be transmitted.

In an embodiment, the receiving, from the BS, of the reference signal via the data channel may include: receiving a reference signal, based on the information about the reference signal configuration to be used for the UE; performing channel estimation, based on the received reference signal; and decoding the data channel, based on a result of the channel estimation and the information about the reference signal configuration to be used for the UE.

According to an embodiment of the disclosure, a base station (BS) in a wireless communication system may include: a communicator; at least one memory including an instruction; and at least one processor configured to execute the instruction to control the BS to transmit, via higher layer signaling, one or more reference signal configurations to a user equipment (UE) so as to transmit a reference signal by using a single carrier, transmit, to the UE, information about a reference signal configuration to be used for the UE from among the one or more reference signal configurations, via at least one of the higher layer signaling, a physical downlink control channel (PDCCH), or a media access control control element (MAC CE), and transmit, to the UE, the reference signal via a data channel, based on the information about the reference signal configuration to be used for the UE.

In an embodiment, the one or more reference signal configurations may include a reference signal configuration for at least one method from among a first reference signal transmitting method of configuring a subcarrier spacing used in transmission of the reference signal to be different from a subcarrier spacing used in transmission of the data channel, a second reference signal transmitting method of transmitting a reference signal on which discrete Fourier transform (DFT) precoding is performed or a reference signal on which sample multiplexing is performed, based on a transmission bandwidth of the data channel, or a third reference signal transmitting method of transmitting the reference signal by using a single carrier having a bandwidth equal to or greater than a bandwidth of a plurality of single carriers when a plurality of data channels respectively corresponding to the plurality of single carriers are transmitted by using the plurality of single carriers.

In an embodiment, the one or more reference signal configurations may include a reference signal configuration for at least one method from among a fourth reference signal transmitting method of transmitting the reference signal in a first band including a plurality of bands for transmitting respective data channels to a plurality of UEs, or a fifth reference signal transmitting method of transmitting a data channel by using a second band, and transmitting the reference signal in bands divided from the second band.

In an embodiment, the at least one processor may be configured to determine a reference signal configuration, based on at least one of the number of single carrier bands, a channel quality, whether transmission of the data channel is succeeded, or the number of UEs to which the data channel is to be transmitted.

In an embodiment, the at least one processor may be configured to determine the reference signal configuration to be used for the UE, based on at least one of a reference signal received power (RSRP), a signal-to-noise ratio (SNR), or a rank, or determining to use a preset reference signal configuration.

Hereinafter, embodiments of the specification will be described in detail with reference to accompanying drawings.

In the following descriptions of embodiments, functions or configurations which are well-known to the art of embodiments of the disclosure and are not directly associated with the disclosure, are not described. By omitting descriptions of unnecessary details, the concept of embodiments of the disclosure can be clearly described.

For the same reasons, in the drawings, some elements may be exaggerated, omitted, or roughly illustrated. Also, size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit" as used in the present embodiment refers to a software or hardware component, such as field-programmable gate array (FPGA) or application-specific integrated circuit (ASIC), which performs certain tasks. However, the term "~unit" does not mean to be limited to software or hardware. A "~unit" may be configured to be in an addressable storage medium or configured to operate one or more processors. Thus, a "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more central processing units (CPUs) in a device or a secure multimedia card. Also, a "~unit" may include one or more processors in embodiments.

An embodiment of the present specification is for a communication system of a base station (BS) which transmits a downlink (DL) signal to a user equipment (UE) in a new radio (NR) system. The DL signal of the NR system includes a data channel on which data information is transmitted, a control channel on which control information is transmitted, and a reference signal (RS) for channel estimation and channel feedback.

In more detail, the NR BS may transmit, to the UE, data and control information via a physical downlink shared channel (PDSCH) and a physical downlink control channel (PDCCH), respectively. The NR BS may have a plurality of RSs, and the plurality of RSs may include one or more of a channel state information RS (CSI-RS), a demodulation RS, and a UE-specific demodulation reference signal (DMRS). The NR BS transmits the UE-specific DMRS only to a region scheduled to transmit data, and transmits a CSI-RS on resources in time and frequency axes so as to obtain channel information of data transmission. Hereinafter, transmission and reception of a data channel may be understood as data transmission and reception on the data channel, and transmission and reception of a control channel may be understood as control information transmission and reception on the control channel.

In a wireless communication system, communication between a BS and a UE are significantly affected due to a radio environment. In particular, in a 60-GHz band, signal attenuation due to moisture and oxygen in the air is very large and scattering due to a length of a small wavelength is present, such that a signal transfer is very difficult. Accordingly, the BS can assure coverage by transmitting a signal with higher power. However, when a signal is transmitted using high transmission power, a multi-carrier transmission technology showing excellent performance in overcoming a multi-path delay effect in a $4^{th}$ generation (4G) system is hardly used due to a high peak to average power ratio (PAPR). However, when single-carrier transmission is performed to use higher transmission power, multiplexing of users is difficult and a problem occurs due to deterioration in channel estimation and channel estimation performance with respect to a multi-path signal. In transmission on a millimeter wave, in order to overcome a high path loss, an analog beam (hereinafter, the analog beam may be interchangeably used with a beam and, in the disclosure, may be understood as a signal with directivity) may be used. In this regard, because a duration of a wavelength of the millimeter wave is very short, a bandwidth of the analog beam is decreased, and in this case, it is more difficult to support multiple users. As a result, it is difficult to guarantee system performance in a millimeter wave band by using a technology for a microwave band.

Therefore, the disclosure describes a method and device for effectively supporting multiplexing of users by using single carrier in a millimeter wave band, and in particular, describes a case where a BS operates one single carrier.

The NR system is developed to satisfy various network requirements, and types of services supported by the NR system may be divided into categories of Enhanced Mobile BroadBand (eMBB), massive Machine Type Communications (mMTC), Ultra-Reliable and Low-Latency Communications (URLLC), and the like. The eMBB is a service for high-speed transmission of high-volume data, the mMTC is a service for minimization of power of the terminal and accesses by multiple terminals, and the URLLC is a service for high reliability and low latency. According to a type of a service applied to a UE, different requirements may be applied.

In a millimeter wave (mmWave) band of 6 GHz enabled to support the NR system, when a BS transmits data to a UE by using single carrier, signal transmission using high power is required to compensate for a high pathloss and signal attenuation. In this case, it is difficult to use a multi-carrier transmission technology, such that, the disclosure describes a method and device for effectively transmitting and receiving a signal by using single carrier in a millimeter wave band.

According to an embodiment of the disclosure, the BS may effectively transmit a RS and increase channel estimation performance, by using single carrier. Also, according to an embodiment of the disclosure, the BS may adjust a waveform to be used for a RS, the number of symbols of the RS, and a sequence, according to a radio wave environment of a UE, and by doing so, channel estimation performance may be increased and a success probability in data transmission may be increased. Also, according to an embodiment of the disclosure, the BS may transmit a RS on single carrier to a plurality of UEs without interference. Also, according to an embodiment of the disclosure, the BS may transmit a RS by using single carrier waveform to one or more UEs without interference. Also, according to an embodiment of the disclosure, the BS may dynamically indicate a position of a symbol on which a RS configured for another UE is transmitted, and thus, may increase reception performance with respect to a data channel. Also, according to an embodiment of the disclosure, the BS may configure a subcarrier spacing for transmitting a data signal differently from a subcarrier spacing for transmitting a RS, and thus, may adjust an amount of resources necessary for transmission of the RS and may multiplex different UEs within one symbol. Also, according to an embodiment of the disclosure, the BS may selectively apply a RS before and after inverse fast Fourier transform (IFFT), according to a size of a bandwidth of a data signal to be transmitted, and thus, may increase resource efficiency. Also, according to an embodiment of the disclosure, the BS may use a RS commonly used by transmitting UEs, and thus, may increase frequency efficiency. Also, according to an embodiment of the disclosure, the BS may configure one or more carriers by dividing a data transmission bandwidth, and may transmit a RS, thereby increasing channel estimation performance.

A method, performed by a BS, of transmitting a RS by using single carrier in a DL, according to an embodiment of the disclosure, may include configuring one or more RS configuration settings as one or more pieces of configuration information, transmitting, by the B S, the one or more pieces of configured information to a UE via higher layer signaling, transmitting, by the BS, a configuration to be used in data transmission from among the one or more pieces of configured information via higher layer signaling, a PDCCH, or a media access control control element (MAC CE), receiving a DMRS based on the configured information, estimating a channel based on the received DMRS, and decoding a physical downlink shared channel (PDSCH) based on received control information.

The BS for transmitting a RS by using single carrier in a millimeter-wave wireless communication system according to an embodiment of the disclosure includes a transmitter and a controller configured to control the transmitter. Also, the UE for receiving a single-carrier carrier signal in the millimeter-wave wireless communication system includes a receiver and a controller configured to control the receiver.

According to an embodiment of the disclosure, the BS may efficiently transmit a RS by using single carrier, may extend coverage, may perform channel estimation without interference, and may increase a success probability of data transmission.

FIG. 1A is a diagram illustrating a structure of a time-frequency domain that is a resource region of an NR system.

In FIG. 1A, a horizontal axis represents a time domain, and a vertical axis represents a frequency domain. In the time-frequency domain, a basic unit of a resource is a resource element (RE) 101 that may be defined as one orthogonal frequency division multiplexing (OFDM) symbol 102 in the time axis and one subcarrier 103 in the frequency axis. In the frequency domain, $N_{SC}^{RB}$ (e.g., 12) consecutive REs may constitute one resource block (RB) (or physical resource block (PRB)) 104.

Figure 1B:
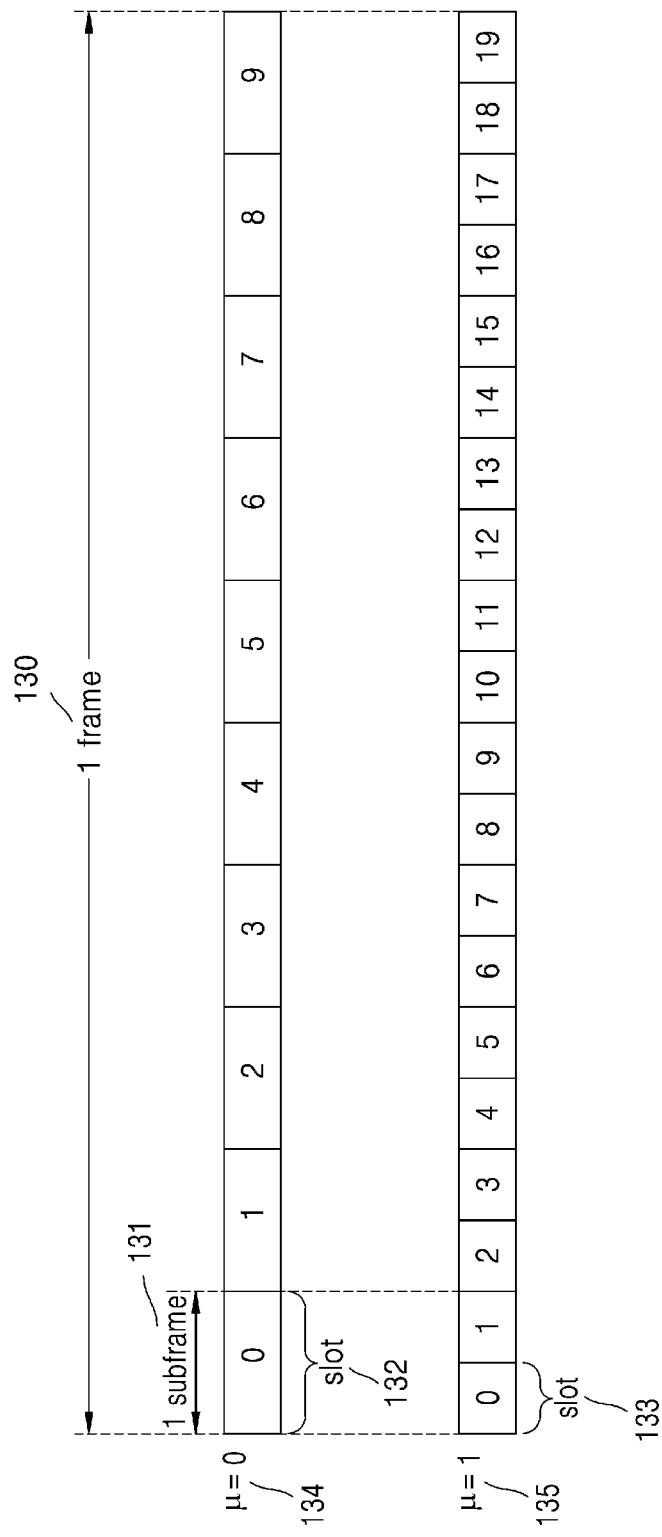
FIG. 1B is a diagram illustrating a slot structure considered in an NR system.

FIG. 1B is a diagram illustrating a slot structure considered in an NR system.

FIG. 1B illustrates an example of a structure of a frame 130, a subframe 131, and a slot 132. One frame 130 may be defined to be 10 ms. One subframe 131 may be defined to be 1 ms, and thus, one frame 130 may consist of 10 subframes 131. One slot 132 or 133 may be defined to be 14 OFDM symbols (i.e., the number of symbols per slot $N_{symbol}^{slot}$ may be 14). One subframe 201 may consist of one or more slots 132 and 133, and the number of slots 132 and 133 per one subframe 131 may vary according to configuration values μ 134 and 135 with respect to subcarrier spacing. Referring to FIG. 1B, a case where μ=0 (134) as a configuration value of subcarrier spacing and a case where μ=1 (135) as a configuration value of subcarrier spacing are illustrated. When μ=0 (134), one subframe 131 may consist of one slot 131, and when μ=1 (135), one subframe 131 may consist of two slots 133. That is, according to a configuration value μ with respect to subcarrier spacing, the number of slots per subframe ($N_{slot}^{subframe,\mu}$) may vary, such that the number of slots per frame ($N_{slot}^{frame,\mu}$) may vary. $N_{slot}^{subframe,\mu}$ and $N_{slot}^{frame,\mu}$ according to each subcarrier spacing configuration μ may be defined as in [Table 1] below.

TABLE 1

| μ | Subcarrier Spacing (kHz) | $N_{symb}^{slot}$ | $N_{slot}^{frame,\mu}$ | $N_{slot}^{subframe,\mu}$ |
|---|---|---|---|---|
| 0 | 15 | 14 | 10 | 1 |
| 1 | 30 | 14 | 20 | 2 |
| 2 | 60 | 14 | 40 | 4 |
| 3 | 120 | 14 | 80 | 8 |
| 4 | 240 | 14 | 160 | 16 |
| 5 | 480 | 14 | 320 | 32 |
| 6 | 960 | 14 | 640 | 64 |

Figure 1C:
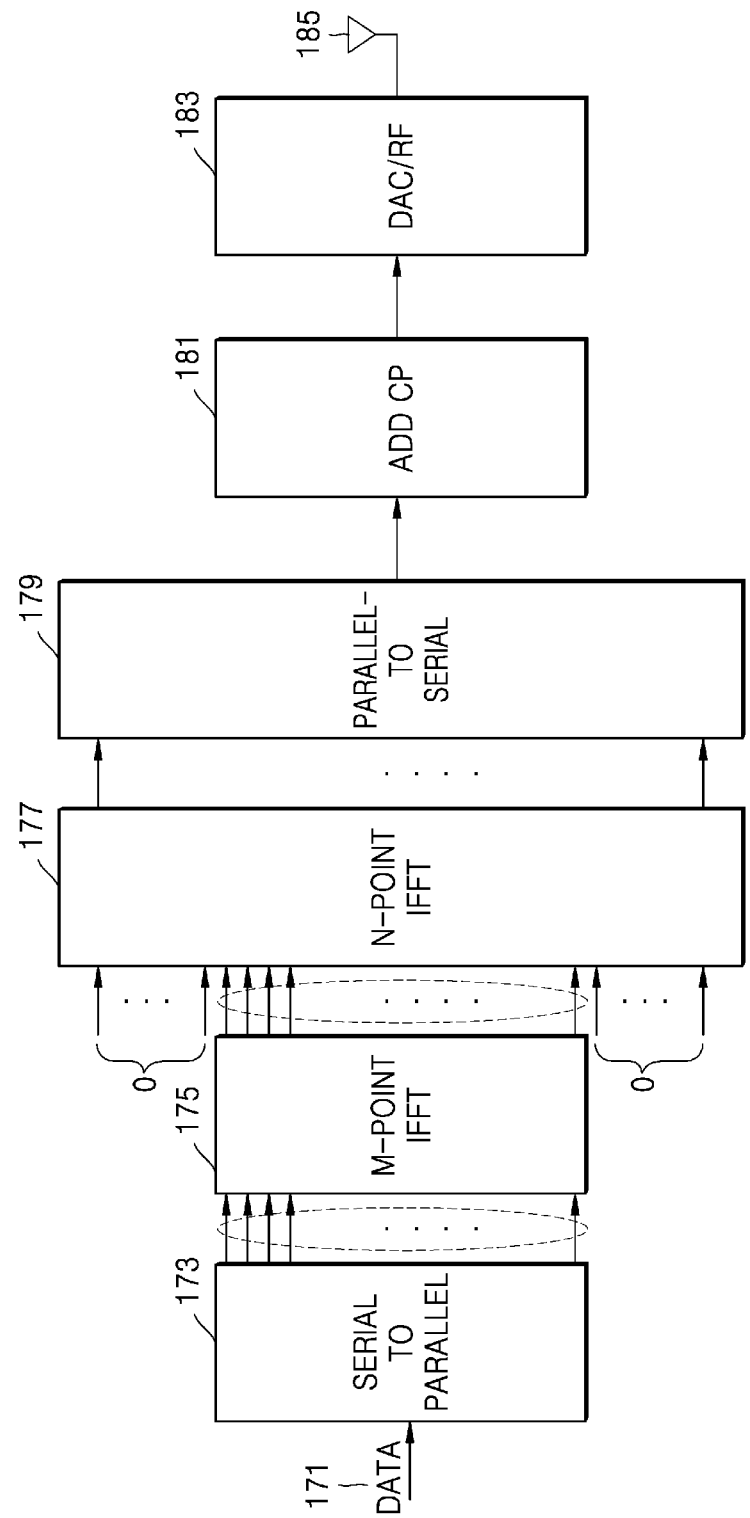
FIG. 1C is a diagram illustrating a communication system for transmitting and receiving data between a base station (BS) and a user equipment (UE) in an NR system.

FIG. 1C is a diagram illustrating a communication system for transmitting and receiving data between a BS and a UE in the NR system.

Referring to FIG. 1C, a transmitter includes a system enabled to perform OFDM transmission, and may transmit single carrier (SC) in a bandwidth allowed for OFDM transmission. The transmitter may include a serial-to-parallel (S-P) converter 173, a single-carrier precoder 175, an inverse fast Fourier transform (IFFT) unit 177, a parallel-to-serial (P-S) converter 179, a cyclic prefix (CP) inserter 181, an analog signal unit (including a digital-to-analog (DAC) convertor and a radio frequency (RF) 183, and an antenna module 185.

Data 171 of which size is M (a data sequence in which a size of a vector is M) and on which channel coding and modulation are performed is converted into a parallel signal by the S-P converter 173, and is converted into a SC waveform (SCW) by the single-carrier precoder 175 thereafter. The precoder 175 for converting a parallel signal into a SCW may be implemented using various methods including, for example, a method of using a discrete Fourier transform (DFT) precoder, a method of using up-converting, a method of using code-spreading, and the like. The transmitter of the disclosure may perform various precoding methods. Hereinafter, for convenience of descriptions, a method of generating a SCW by using a DFT precoder will now be described, but, an embodiment of the disclosure may be equally performed in a case where a SCW is generated by using another method.

A size of a DFT is equal to M, and a data signal that has passed the DFT precoder of a length of M (or a DFT filter) is converted into a wideband frequency signal via the N-point IFFT unit 177. An N-point IFFT unit performs process such that a parallel signal is transmitted on respective subcarriers of a channel bandwidth divided into the N subcarriers. However, in FIG. 1C, because DFT precoding with a length of M is performed before N-point IFFT process, a signal on which DFT precoding is performed is transmitted on one SC with respect to a center carrier of a bandwidth to which the signal on which DFT precoding is performed is mapped. An N-point IFFT processed signal (data) passes through a procedure by the P-S converter 179 and then is stored as N samples, and here, some samples at the rear from among the N stored samples are copied and thus are concatenated to the front. Such procedure is performed by the CP inserter 181.

Afterward, the signal passes through a pulse shaping filter such as a raised cosine filter and then is transferred to the analog signal unit 183. The analog signal unit 183 converts the received signal into an analog signal via a digital-to-analog conversion procedure using a power amplifier (hereinafter, the PA), and the converted analog signal is transferred to the antenna module 185 and is broadcast to the air.

A general SCW signal is transmitted in a manner that M precoded signals are mapped to desired M consecutive subcarriers and transmitted, and this procedure may be performed by the IFFT unit 177. Therefore, according to a size of data to be transmitted or an amount of time symbols to be used by the data to be transmitted, a size of M is determined. In general, the size of M is much smaller than N, and this is because a feature of the SCW is a signal of which peak-to-average-power ratio (PAPR) is small.

A PAPR refers to a size of variation in transmission power of a sample of a signal to be transmitted, and when the PAPR is large, this means that a dynamic range of a PA of a transmitter is large. This means that a power margin requested to operate the PA is large. In this case, the transmitter configures an available margin of the PA to be high, in preparation for a possibility that the variation is large, and therefore, maximum power usable by the transmitter is decreased. As a result, a maximum transmission range available between the transmitter and a receiver is decreased. On the other hand, in a case of a SCW of which PAPR is small, variation of the PA is very small, and thus, even when a margin is configured to be small, it is possible to operate the PA, such that a maximum communication range is increased.

In a case of a millimeter-wave wireless communication system, radio wave attenuation is high, such that it is important to guarantee a communication range. Therefore, it is advantageous for the BS to use a scheme of increasing a maximum communication range, such as a SCW. In general, the SCW has a margin higher than a multi-carrier waveform (MCW) by about 5 to 6 dB, and thus, a SCW transmitter uses higher transmission power than MCW, such that a communication range may be increased. A SCW of FIG. 1C may be generally used in a UE for which a limit in maximum transmission power of a UL is small, and in particular, may be used in UL transmission in the LTE system. In particular, the limit in the maximum transmission power of the UE is not large, the UE cannot configure a size of M to be high due to insufficient UL transmission power, and as transmission power is decreased, the UE decreases M and thus may guarantee a communication range.

Also, UL transmission refers to a case where the BS receives a signal transmitted by one UE, and thus, it is not necessary to consider a case where one or more UEs transmit signals by using a same SC. On the other hand, in the case of the millimeter-wave wireless communication system, insufficiency of power occurs even in a DL due to radio wave attenuation, and in a case of DL transmission, it is essential for the BS to transmit signals for one or more UEs at one time, and thus, a support therefor is requested.

Configurations for RS transmission using a SC in a millimeter wave band described in the disclosure are as in [Table 2], [Table 3], and [Table 4]. A configuration may include positions of a symbol on which a DMRS is transmitted, and sequence types to be used.

TABLE 2

DMRS configuration for PDSCH transmission in a unit of a SC-based slot

| Configuration A | Symbol Positions (i1, i2) |
| --- | --- |
| 1 | 3, 10 |
| 2 | 4, 11 |
| 3 | 5, 12 |
| 4 | 6, 13 |
| 5 | 2, 9 |
| 6 | 1, 8 |
| 7 | 0, 7 |

TABLE 3

DMRS configuration for PDSCH transmission in a unit of a SC-based mini-slot

| Mini-slot Size | Configuration A | Symbol Positions |
| --- | --- | --- |
| 7 | 1 | 2, 5 |
| 7 | 2 | 1, 4 |
| 4 | 1 | 0, 2 |
| 4 | 2 | 1, 3 |
| 2 | 1 | 0 |
| 2 | 1 | 1 |

TABLE 4

DMRS sequence configuration for SC-based PDSCH transmission

| Configuration B | Sequence Types |
| --- | --- |
| 1 | Pi/2-BPSK |
| 2 | Full ZC |
| 3 | Half ZC with offset 0 |
| 4 | Half ZC with offset 1 |

Here, [Table 2] refers to DMRS configuration for PDSCH transmitted based on a slot. For example, when Configuration A is set as 1, a symbol position of a DMRS for PDSCH transmission may be configured as k0+i. K0 indicates a start point, and when k0 is 0, the DMRS may be transmitted on symbols of 3 and 10 (k0+i1 and k0+i2), and when k0=1, the DMRS may be transmitted on symbols of 4 and 11 that are k0+i1 and k0+i2. In another method, when k0>0, the DMRS may be transmitted on symbols of 4 and 10 that are K0+i1 and i2. The former method involves applying k0 as the start point to both of two symbols, and in the latter method, when a position of one DMRS is determined from among two DMRSs, the DMRS is transmitted regardless of k0.

[Table 3] refers to DMRS configuration for PDSCH transmitted in a mini-slot. For example, in a case where a length of a mini-slot is set as 7 and Configuration A is set as 1, symbol positions of a DMRS for PDSCH transmission indicate $2^{nd}$ and $5^{th}$ symbols from k0 that is a start point of PDSCH.

[Table 4] refers to a DMRS sequence configuration method for SC-based PDSCH transmission. Configuration B is a setting for generation of a sequence. When Configuration B is set as 1, the sequence may correspond to a sequence in which transmission is performed based on pi/2-BPSK. When Configuration B is set as 2, the sequence may correspond to a Zadoff-Chu sequence which is a full ZC, designed for transmission of a length of M size of a SC band. When a subcarrier on which the SC band is transmitted is j, j+1, . . . , j+M, the sequence may be mapped from j up to j+M. When Configuration B is set as 3, the sequence may correspond to a Zadoff-Chu sequence which is a half ZC with offset 0, designed for transmission of an M/2 length that is half the M size of the SC band, and a subcarrier spacing may be 2 and a mapping offset may be 0. Therefore, when a subcarrier on which the SC band is transmitted is j, j+1, . . . , j+M−1, the sequence may be mapped to j, j+2, . . . , j+M−2. When Configuration B is set as 4, the sequence may correspond to a Zadoff-Chu sequence which is a half ZC with offset 1 designed for transmission of an M/2 length that is half the M size of the SC band, and a subcarrier spacing may be 2 and a mapping offset may be 1. Therefore, when a subcarrier on which the SC band is transmitted is j, j+1, . . . , j+M−1, the sequence may be mapped to j+1, j+3, . . . , j+M−1.

[First Embodiment] (a Case where the BS Uses Only One SC Band)

The first embodiment of the disclosure relates to a method by which the BS transmits one or more PDSCHs by using only one SC band. The BS transmits one or more pieces of RS configuration information via higher layer signaling, and configures one or more pieces of RS configuration information, based on higher layer signaling, PDCCH or MAC CE. For example, for a case of slot-based PDSCH transmission, the BS may indicate one RS configuration information as a combination of Configuration 1={Configuration A, Configuration B}. Afterward, the BS may indicate a configuration to be used in actual transmission from among configurations, based on higher layer signaling, PDCCH or MAC CE. A configuration N may additionally transfer an initial value for generation of a RS sequence, an initial value for sequence scrambling, a root sequence of a ZC sequence, a cyclic shift value of the ZC sequence, and the like, in addition to the RS configuration information. This will now be described with reference to FIG. 2.

Figure 2:
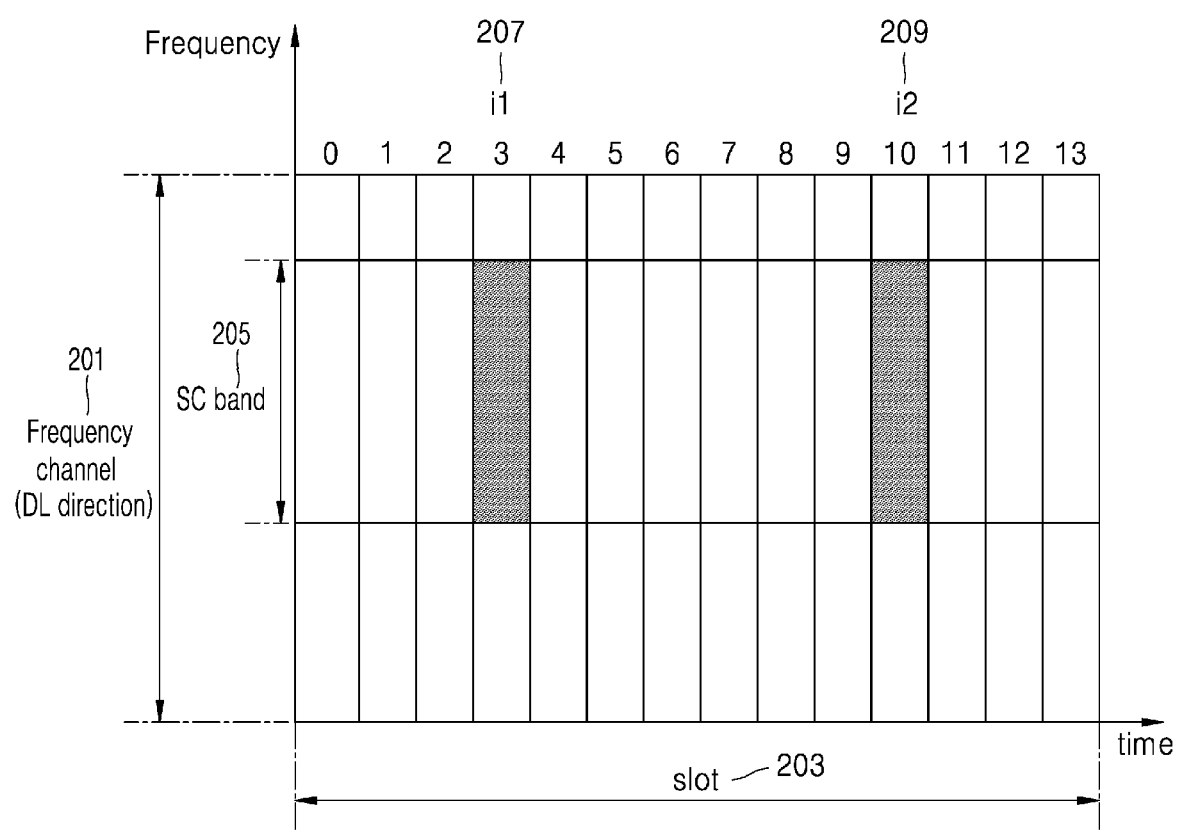
FIG. 2 is a diagram illustrating a method of transmitting a reference signal (RS) according to a first embodiment of the disclosure.

FIG. 2 is a diagram illustrating a method of transmitting a RS according to the first embodiment of the disclosure.

Referring to FIG. 2, one slot 203 is illustrated in units of symbols on a time axis, and a frequency domain illustrates a DL channel 201. In this regard, when the BS transmits data via a SC band 205, symbol positions of a DMRS indicated by Configuration A indicated via higher layer signaling are reference numerals 207 and 209. Here, information of a sequence used by each DMRS follows Configuration B. The method of transmitting a RS according to the first embodiment is as below. When PDSCH is transmitted within a SC band to one UE, Configuration B may be set as 1 or 2 from among configurations including Configuration B. When a signal-to-noise ratio of a UE is poor, a received signal quality is equal to or less than a reference, or previous data transmission fails, the BS may set Configuration B as 1 and thus may increase transmission power. When Configuration B is set as 1, PDSCH transmission is fixed with BPSK modulation. When PDSCH is sequentially transmitted within a SC band to one or more UE, the BS may set Configuration B as 2, 3, or 4 from among configurations including Configuration B, and may indicate a root sequence to be used in a ZC sequence, or different cyclic shift values in a same root sequence. When a signal-to-noise ratio of a UE is poor, a received signal quality is equal to or less than a reference, or previous data transmission fails, the BS may set Configuration B as 3 or 4. When data is transmitted to two different UEs, the BS may configure Configuration 3 for one UE and may configure Configuration 4 for another UE, and in this regard, when the data is transmitted in the SC band by using a DFT precoder, a sample of a DMRS transmitted to each UE does not overlap on a time axis, and thus, the BS may maximally use transmission power, and transmission efficiency may be improved.

[Second Embodiment] (a Case where the BS Uses One or More SC Bands)

The second embodiment of the disclosure relates to a method by which the BS transmits signals by using one or more SC bands, and in particular, to a method of transmitting PDSCH for one UE in one SC band. This will now be described with reference to FIG. 3.

Figure 3:
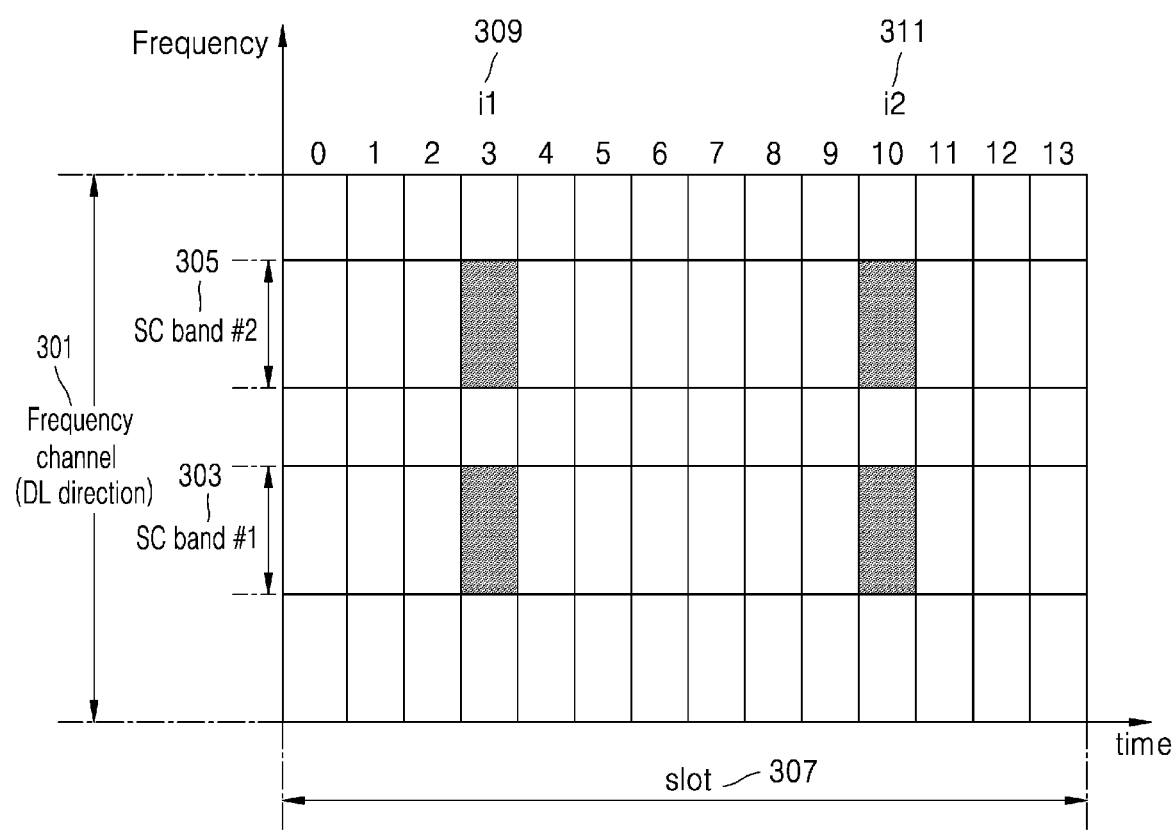
FIG. 3 is a diagram illustrating a method of transmitting a RS according to a second embodiment of the disclosure.

FIG. 3 is a diagram illustrating a method of transmitting a RS according to the second embodiment of the disclosure. Referring to FIG. 3, one slot 307 is illustrated in units of symbols on a time axis, and a frequency domain illustrates a DL channel 301. In this regard, when the BS transmits data via bands 303 and 305 using two SCs (here, it is assumed that UE 1 uses the band 303 and UE 2 uses the band 305), symbol positions of a DMRS indicated by Configuration A indicated to UEs 1 and 2 via higher layer signaling are reference numerals 309 and 311. Here, provided is a method by which the BS sets UE 1 with Configuration B as 3 and sets UE 2 with Configuration B as 4. When UE 1 and UE 2 use 2 and 4 of Configuration B, the BS may perform DFT precoding to allow UE 1 to occupy the band 303 and may perform DFT precoding to allow UE 2 to occupy the band 305. Here, a gap between REs used in symbols 309 and 311 on which RSs are transmitted is 1, and thus, signals may be transmitted without interference therebetween. However, to do so, sizes of bandwidths of 303 and 305 should be equal. When the sizes of the bandwidths of 303 and 305 are different, the BS may set UE 1 with Configuration B as 2 and equally set UE 2 with Configuration B as 2, and for discrimination, may indicate different root sequences of a ZC sequence, indicate different scrambling for a same root sequence, or indicate different cyclic shifts for a same root sequence. In this case, although an amount of interference is increased, compared to a method of setting Configuration B as 3 and 4, a root sequence causing small interference may be pre-searched and configured.

[Third Embodiment] (a Method by which the BS Configures One or More Configurations A and Indicates Configuration A to be Actually Used, and the BS Indicates Whether all DMRSs of One or More Configurations A are Transmitted in PDCSH Transmission The third embodiment of the disclosure is for the BS to prevent a channel estimation loss occurring due to overlapping between a symbol on which a RS is transmitted and a data symbol. This will now be described with reference to FIG. 4.

Figure 4:
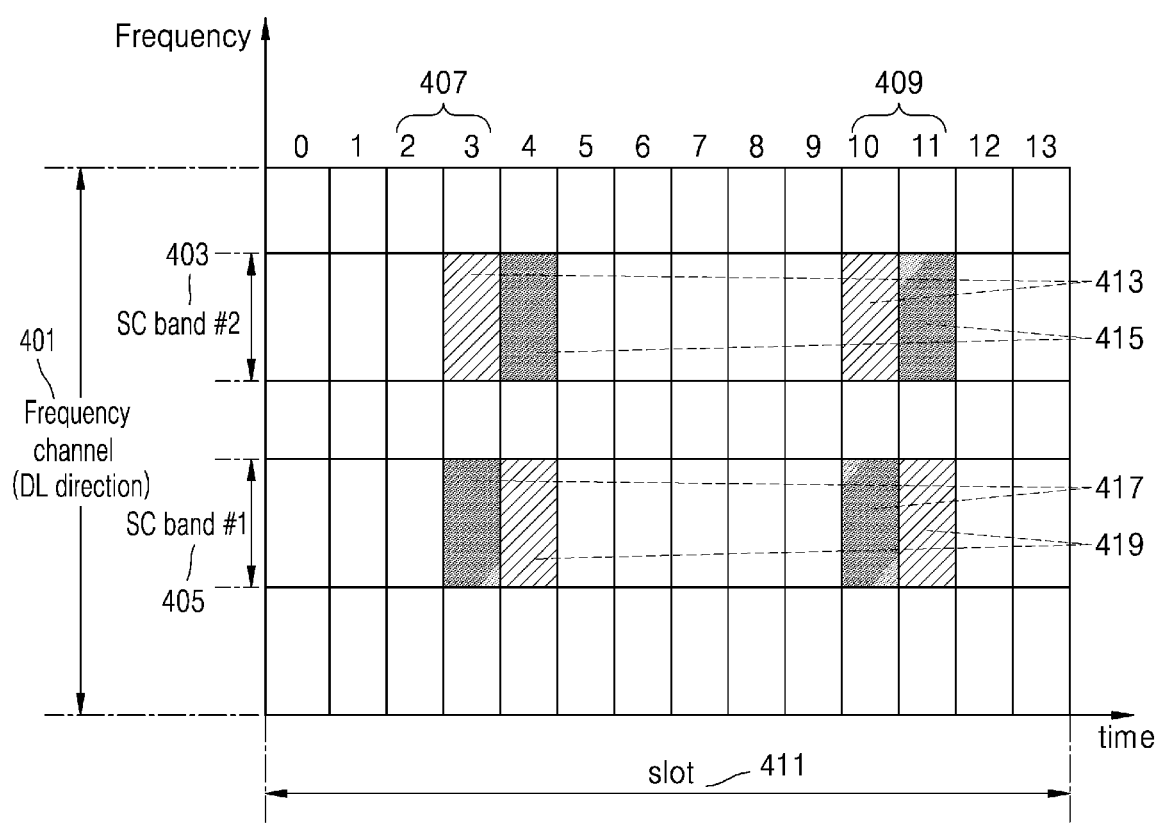
FIG. 4 is a diagram illustrating a method of transmitting a RS according to a third embodiment of the disclosure.

FIG. 4 is a diagram illustrating a method of transmitting a RS according to the third embodiment of the disclosure.

Referring to FIG. 4, one slot 411 is illustrated in units of symbols on a time axis, and a frequency domain illustrates a DL channel 401. In this regard, when the BS transmits data via bands 405 and 403 using two SCs (here, it is assumed that UE 1 uses the band 405 and UE 2 uses the band 403), symbol positions of a DMRS indicated by two Configurations A (1 and 2) indicated to UEs 1 and 2 via higher layer signaling are reference numerals 407 and 409. Here, the BS may indicate, via higher layer signaling, PDCCH or MAC CE, a position of a DMRS used in actual transmission as reference numeral 419 for UE 1 and reference numeral 413 for UE 2. Also, in relation to assumption of rate matching for PDSCH reception, the BS may indicate UE 1 as reference numeral 417 and may indicate UE 2 as reference numeral 415. This indication method may be performed via two examples below.

(Method 1) One or more Configurations A are already indicated, and Configuration A actually used from among them is indicated. Provided is a method of signaling how a UE can perform assumption of rate matching for PDSCH reception.

[Table 5], [Table 6], and [Table 7] below are descriptions of an example of the method 1 described above.

TABLE 5

A method of indicating a DMRS position actually used

| State | Symbol Positions (Assume configuration set as 1, 2 of Configuration A) |
|---|---|
| 0 | 3, 10 |
| 1 | 4, 11 |

TABLE 6

A method of indicating whether there is rate matching

| State | Rate Matching Assumption |
|---|---|
| 00 | 3, 10 |
| 01 | 4, 11 |
| 10 | 3, 4, 10, 11 |
| 11 | No rate matching |

TABLE 7

A method of jointly indicating symbol positions and whether there is rate matching

| State | Symbol Positions | Rate Matching Assumption |
|---|---|---|
| 00 | 3, 10 | 4, 11 |
| 01 | 4, 11 | 3, 10 |
| 10 | 3, 10 | NA |
| 11 | 4, 11 | NA |

[Table 5] refers to a method of indicating a DMRS position actually used, based on higher layer signaling, PDCCH or MAC CE, when a symbol set via higher layer signaling is configured as a sum of 1 and 2 of Configuration A. When state 0 is indicated, a symbol position is indicated as 1 of Configuration A, and when state 1 is indicated, a symbol position is indicated as 2 of Configuration A.

[Table 6] refers to a method of indicating assumption of rate matching for PDSCH reception by a UE when a symbol set via higher layer signaling is configured as a sum of 1 and 2 of Configuration A. Here, rate matching for PDSCH reception indicates that, when a UE is indicated with a start symbol and an end symbol of a PDSCH via scheduling information of PDCCH, the UE identifies the start symbol and the end symbol of transmission of the PDSCH via the indicated information of PDCCH, and in addition thereto, the UE determines, via assumption of rate matching, a position of a PDSCH symbol actually transmitted and transfers it to a demodulator. This is to prevent that data reception performance is decreased due to interference caused by DMRS transmission for another user. Referring to [Table 6], when state 00 is indicated, the UE determines that a PDSCH is not transmitted on symbols of 3 and 10. When state 01 is indicated, the UE determines that a PDSCH is not transmitted on symbols of 4 and 11. When state 10 is indicated, the UE determines that a PDSCH is not transmitted on symbols of 3, 4, 10, and 11. When state 11 is indicated, the UE determines that there is no symbol on which a PDSCH is not transmitted.

Indications of [Table 5] and [Table 6] may be jointly indicated with indication of [Table 7]. When describing with reference to [Table 7], when state 00 is indicated, the UE determines that DMRS transmission symbols are 3 and 10, and identifies that PDSCH transmission is not performed on symbols of 4 and 11. When state 01 is indicated, the UE determines that DMRS transmission symbols are 4 and 11, and identifies that PDSCH transmission is not performed on symbols of 3 and 10. When state 10 is indicated, the UE determines that DMRS transmission symbols are 3 and 10, and determines that there is no additional assumption of rate matching. When state 11 is indicated, the UE determines that DMRS transmission symbols are 4 and 10, and determines that there is no additional assumption of rate matching.

(Method 2) One or more Configurations A are already indicated, and a symbol position of Configuration A actually used from among them is indicated. Provided is a method of signaling how a UE can perform assumption of rate matching for PDSCH reception.

[Table 8] and [Table 9] below are descriptions of an example of the method 2 described above.

TABLE 8

A method of indicating DMRS symbol positions

| State | Symbol Positions (Case where setting is configuration A = 1) |
|---|---|
| 00 | 3, 10 |
| 01 | 4, 11 |
| 10 | 5, 12 |
| 11 | 6, 13 |

TABLE 9

A method of jointly indicating DMRS symbol positions and whether there is rate matching

| State | Symbol Positions Case where setting is configuration A = 1) | Rate Matching Symbol Positions |
|---|---|---|
| 00 | 3, 10 | No rate matching |
| 01 | 4, 11 | 3, 10 |
| 10 | 5, 12 | 3, 10 |
| 11 | 6, 13 | 3, 10 |

The method 2 refers to a method of indicating one Configuration A via higher layer signaling, and indicating, based on higher layer signaling, PDCCH or MAC CE, a symbol position actually used, based on Configuration A. When describing with reference to [Table 8], [Table 8] refers to a case where Configuration A is set as 1 via higher layer signaling. Here, via additional signaling, positions of DMRS symbols actually transmitted are 3 and 10 in a case of state 00, are 4 and 11 in a case of state 01, are 5 and 12 in a case of state 10, and are 6 and 13 in a case of state 11. When whether there is rate matching is jointly indicated, a method as in [Table 9] may be used, and when state 00 is indicated, the UE determines that positions of DMRS symbols are 3 and 10, and that there is no additional assumption of rate matching. When state 01 is indicated, the UE determines that positions of DMRS symbols are 4 and 11, and assumes that a PDSCH is not to be transmitted on 3 and 10 according to assumption of rate matching. When state 10 is indicated, the UE determines that positions of DMRS symbols are 5 and 12, and assumes that a PDSCH is not to be transmitted on 3 and 10 according to assumption of rate matching. When state 11 is indicated, the UE determines that positions of DMRS symbols are 6 and 13, and assumes that a PDSCH is not to be transmitted on 3 and 10 according to assumption of rate matching.

According to the third embodiment, even when one or more data channels are transmitted using a SC, the UE may obtain a channel without interference due to channel estimation among users, and may receive a PDSCH without interference due to a DMRS for another user.

[Fourth Embodiment] (BS Configures SCS Used in DMRS to be Different from SCS for Data Transmission of PDSCH Via Table 1)

The fourth embodiment of the disclosure is for the BS to transmit, on one symbol, a RS for different users by performing time division multiplexing (TDM) thereon. Via higher layer signaling, the BS indicates the UE with subcarrier spacing u1 used in data transmission and spacing u2 used in RS transmission. Although there is no limit on configuration of u1 and u2, provided is an example in which u2 is twice as large as u1.

Figure 5A:
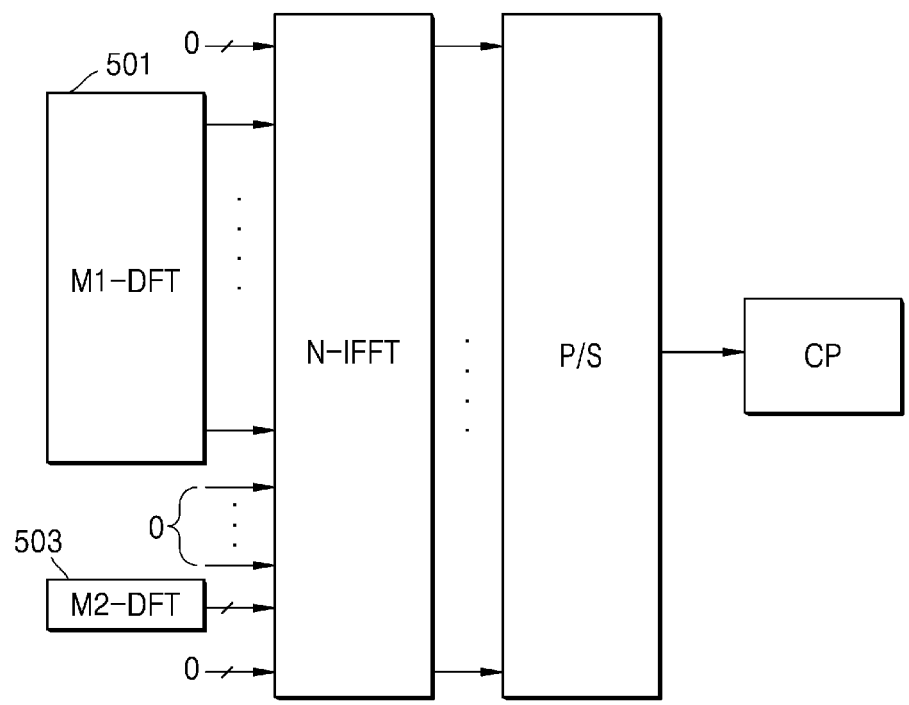
FIG. 5A is a diagram illustrating a data symbol transmitting method according to a fourth embodiment of the disclosure.
Figure 5B:
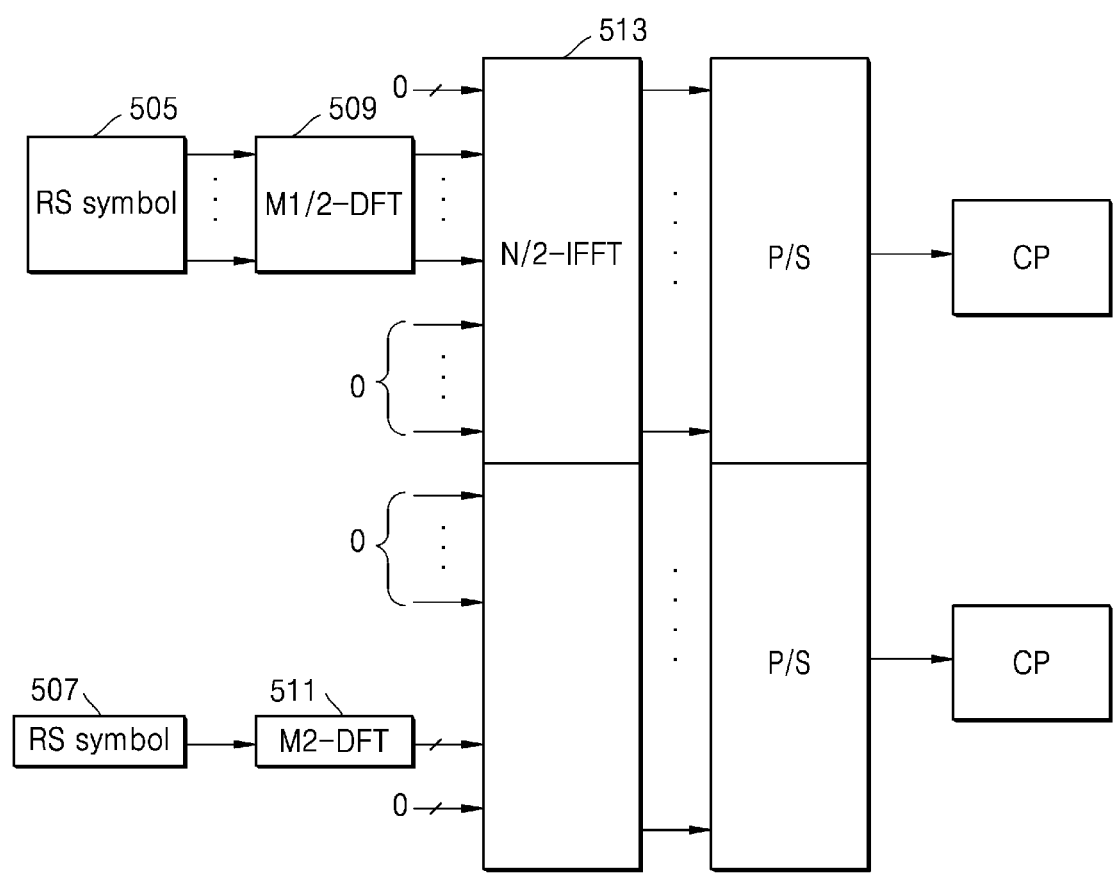
FIG. 5B is a diagram illustrating an RS symbol transmitting method according to the fourth embodiment of the disclosure.
Figure 5C:
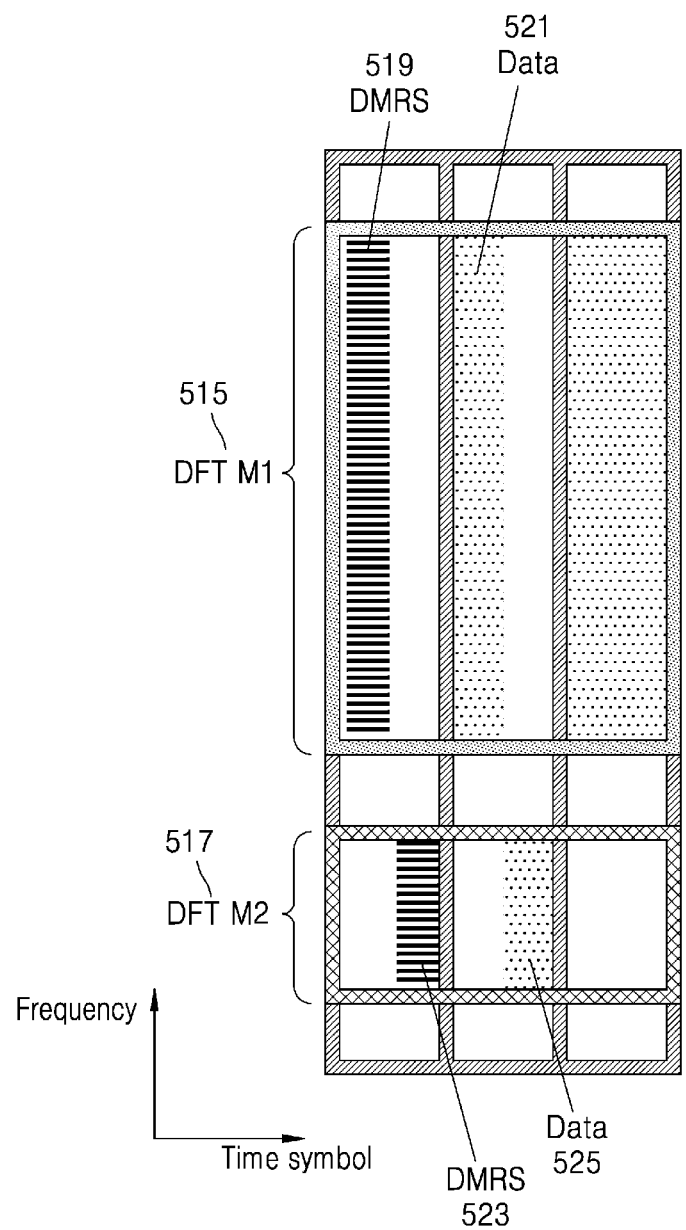
FIG. 5C is a diagram illustrating an RS transmitting method according to the fourth embodiment of the disclosure.

FIG. 5A is a diagram illustrating a data symbol transmitting method according to the fourth embodiment of the disclosure, FIG. 5B is a diagram illustrating an RS symbol transmitting method according to the fourth embodiment of the disclosure, and FIG. 5C is a diagram illustrating an RS transmitting method according to the fourth embodiment of the disclosure.

When describing with reference to FIGS. 5A, 5B, and 5C, the BS performs signal processing of FIG. 5A for data transmission, and performs a signal processing procedure of FIG. 5B for RS transmission. In data transmission, a signal that has passed through an M1 DFT precoder 501 or an M2 DFT precoder 503, depending on a UE, may be transferred as an input to an IFFT. The input to the IFFT indicates a position of a frequency band. For an RS, the signal processing procedure may be performed by using size information of the M1 DFT precoder 501 and the M2 DFT precoder 503 used in data channel transmission. When data is transmitted by using the M1 DFT precoder 501, an RS symbol 505 passes through a DFT precoder 509 of which length is M1/2, and passes through an IFFT 513 of which size is N/2. On the other hand, when data is transmitted by using the M2 DFT precoder 503, an RS symbol 507 passes through a DFT precoder 511 of which length is M2/2, and passes through the IFFT 513 of which size is N/2. Actual transmission of the passed signal may be as shown in FIG. 5C.

FIG. 5C illustrates some symbols on which a RS is transmitted and some data symbols. In FIG. 5C, reference numeral 515 and reference numeral 517 indicate that data signals respectively processed by the M1 DFT precoder 501 and the M2 DFT precoder 503 are transmitted. As assumed above, in a case where spacing u2 used in RS transmission is twice as large as subcarrier spacing u1, subcarrier spacing for an RS is twice as large as that for a data signal, and thus, when a half of a length of the RS passes through DFT and IFFT coders, actual transmission occupies a region, as in reference numeral 519, which corresponds to a half of a data symbol. Equally, an RS to be transmitted in a band of reference numeral 517 may be transmitted, through a same procedure, in a region corresponding to a half of a data symbol as in reference numeral 523. As such, two RS symbols are time division multiplexed and then transmitted, such that it is possible to transmit the two RS symbols on one data symbol.

According to the fourth embodiment of the disclosure, an overhead of a resource used in DMRS transmission may be decreased.

[Fifth Embodiment] (Method of Selectively Applying an RS Method 1 and an RS Method 2 According to a Size of a SC Band of a PDSCH to be Transmitted)

The fifth embodiment of the disclosure relates to a method of transmitting RSs with different types according to a transmission bandwidth of a PDSCH. According to the fifth embodiment of the disclosure, the BS may configure a first RS and a second RS.

Figure 6A:
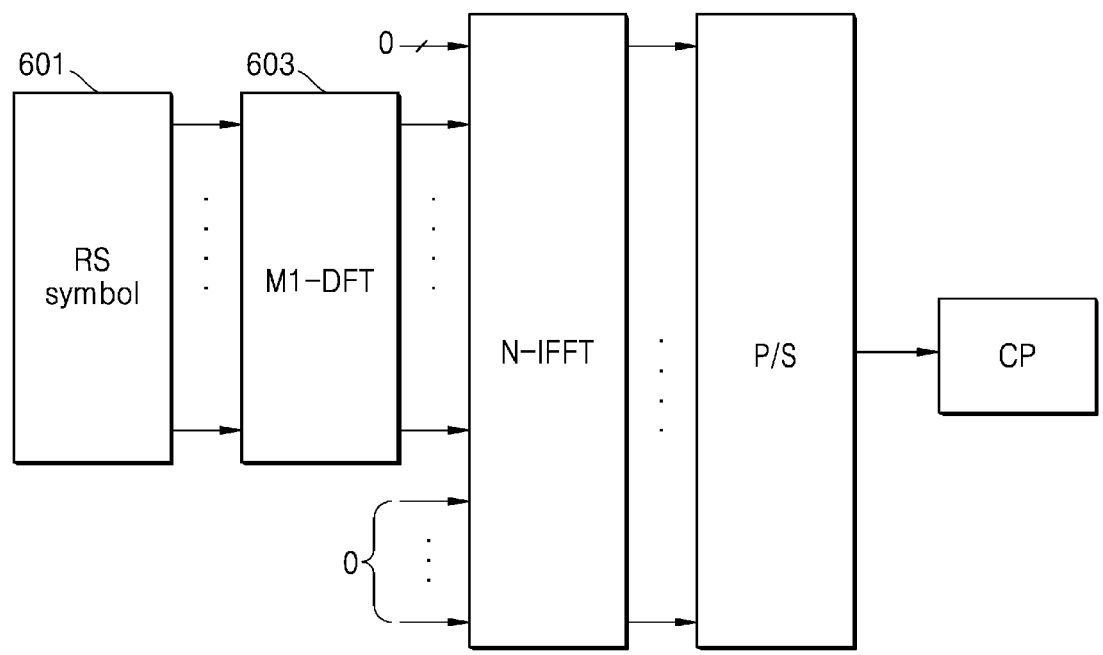
FIG. 6A is a diagram illustrating a data symbol transmitting method according to a fifth embodiment of the disclosure
Figure 6B:
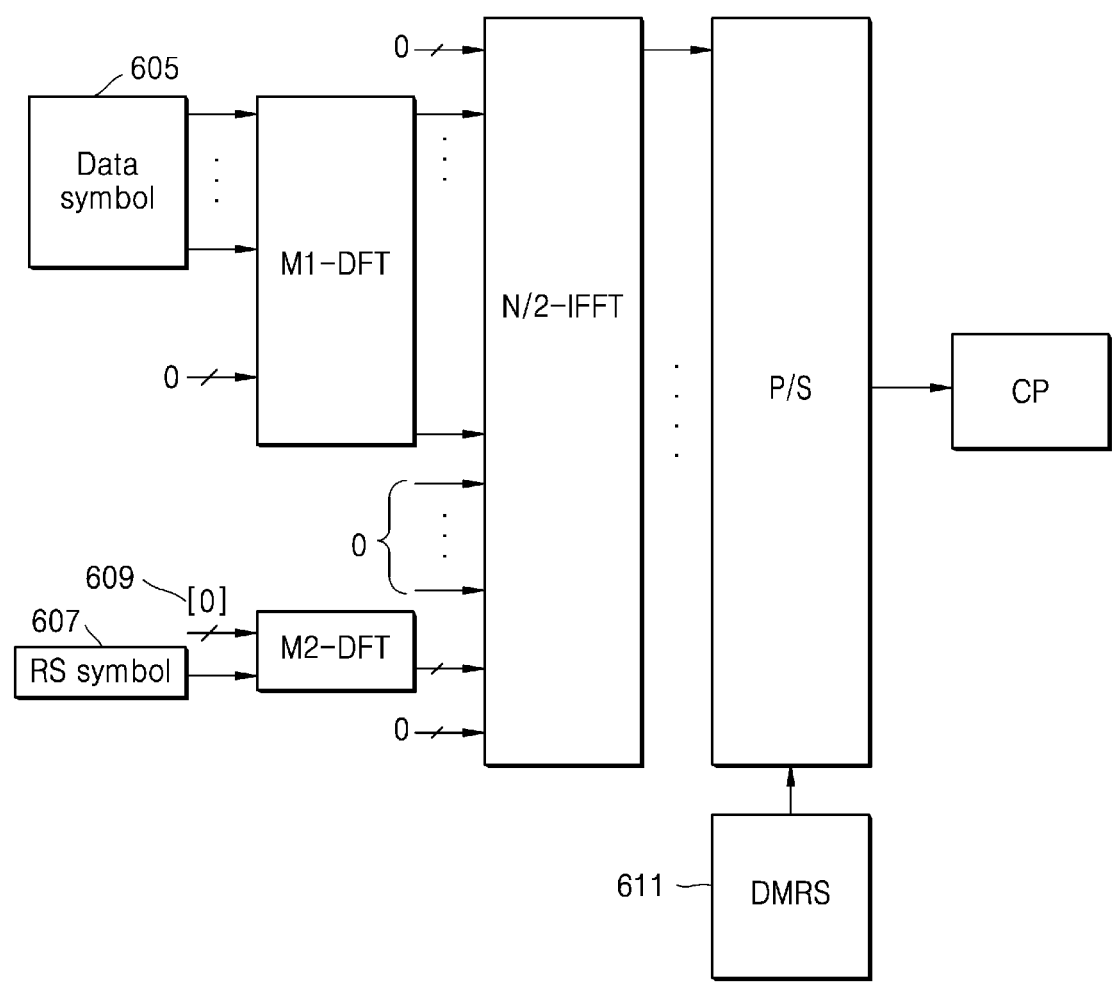
FIG. 6B is a diagram illustrating an RS symbol transmitting method according to the fifth embodiment of the disclosure.
Figure 6C:
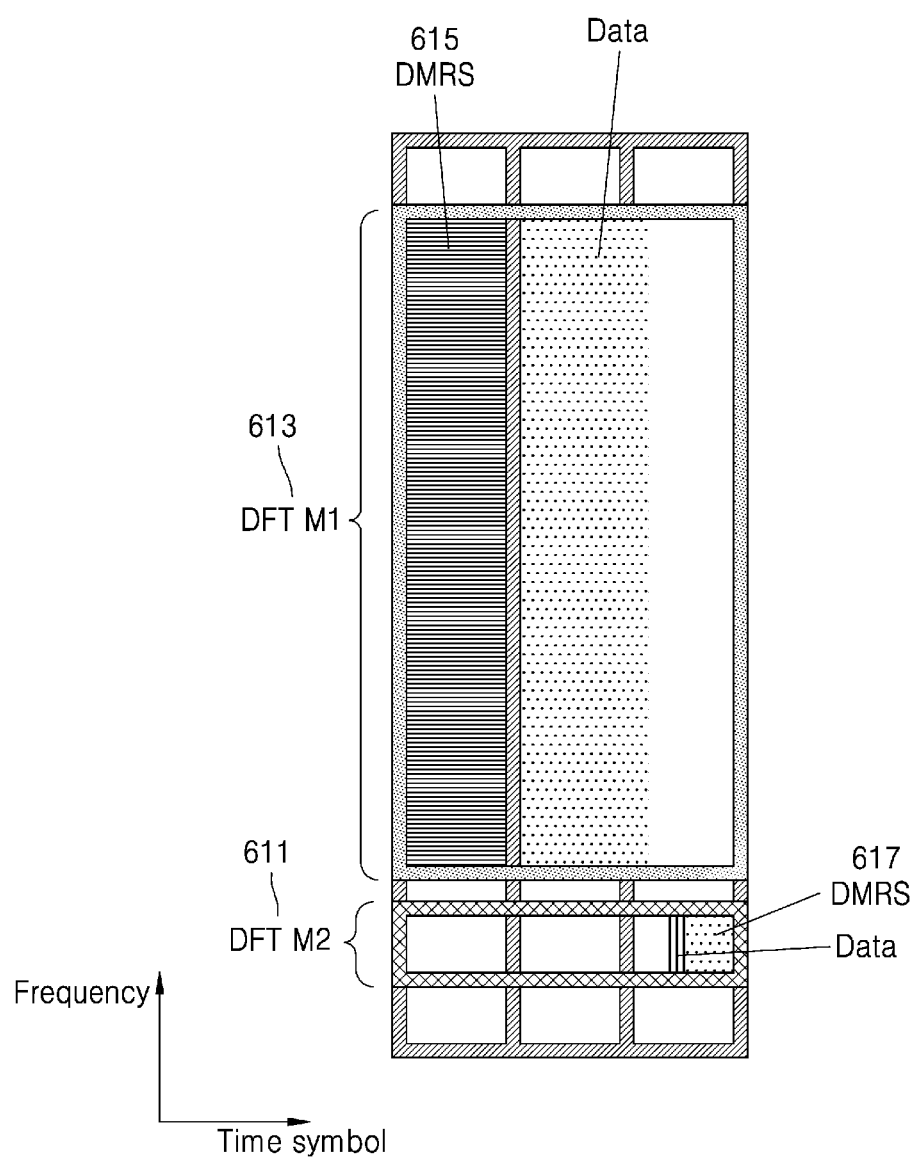
FIG. 6C is a diagram illustrating an RS transmitting method according to the fifth embodiment of the disclosure.

FIG. 6A is a diagram illustrating a data symbol transmitting method according to the fifth embodiment of the disclosure, FIG. 6B is a diagram illustrating an RS symbol transmitting method according to the fifth embodiment of the disclosure, and FIG. 6C is a diagram illustrating an RS transmitting method according to the fifth embodiment of the disclosure.

Referring to FIGS. 6A, 6B, and 6C, the first RS may be transmitted on an RS symbol 601 by using an M1-DFT precoder 603, and the second RS may be transmitted through sample multiplexing after IFFT as in reference numeral 611. For example, the first RS may use a ZC sequence, and because sequence characteristics of the ZC sequence are equal before and after DFT, the first RS may be transmitted on the RS symbol 601 by using the M1-DFT precoder 603 or may be transmitted without the M1-DFT precoder 603. A signal of the M1-DFT precoder 603 is transmitted in a particular band, such that channel estimations of both time and frequency bands are possible and thus the signal is useful in wideband transmission. On the other hand, the second RS is a signal added to a signal converted into a time sample, such that a sequence having an excellent auto-correlation characteristic with respect to the signal may be generated, and then a signal may be generated by performing an up-converting and sampling procedure on the sequence. The second RS uses only a characteristic of a time sample, such that a channel estimation performance with respect to a frequency axis is relatively low, compared to the first RS. Therefore, the second RS is useful in a region of a small bandwidth. Therefore, in the fifth embodiment of the disclosure, when a bandwidth for transmission is indicated as a size of PRB, in a case where the size of PRB is L, the first RS may be used, and in a case where the size of PRB is smaller than L, the second RS may be used. Also, in order to add the second RS at a sample unit, zero as reference numeral 609 may be added to a data symbol 607 before the M2-DFT precoder. A first RS 615 may be transmitted using a SC in a bandwidth configured as in reference numeral 613, and may be transmitted by wholly using one symbol. On the other hand, a second RS 617 may be transmitted on only some samples of one symbol, and may be used for data transmission for which bandwidth is small as in reference numeral 611. In a case where a channel environment is almost flat as line-of-sight in a frequency band, wideband transmission may be enabled for a second RS, and a value of L and a transmission method configuration therefor may be indicated to the UE via higher layer signaling.

According to the fifth embodiment of the disclosure, channel estimation optimized for a size of a data transmission bandwidth is possible.

[Sixth Embodiment] (Case where the BS Uses One or More DFT Precoders for a PDSCH and Uses One Combined DFT Precoder for a DMRS)

The sixth embodiment of the disclosure relates to a method by which, when the BS simultaneously transmits a PDCSH to one or more UEs by using one or more SC bands, the BS transmits a DMRS by using a SC band larger than a data transmission band. The BS may set a size of a DFT precoder to be M1 or M2 for data channel transmission, and may configure a size of a DFT precoder of an RS therefor to be M3. Here, M3 may be equal to or greater than a size of M1 and M2.

Figure 7A:
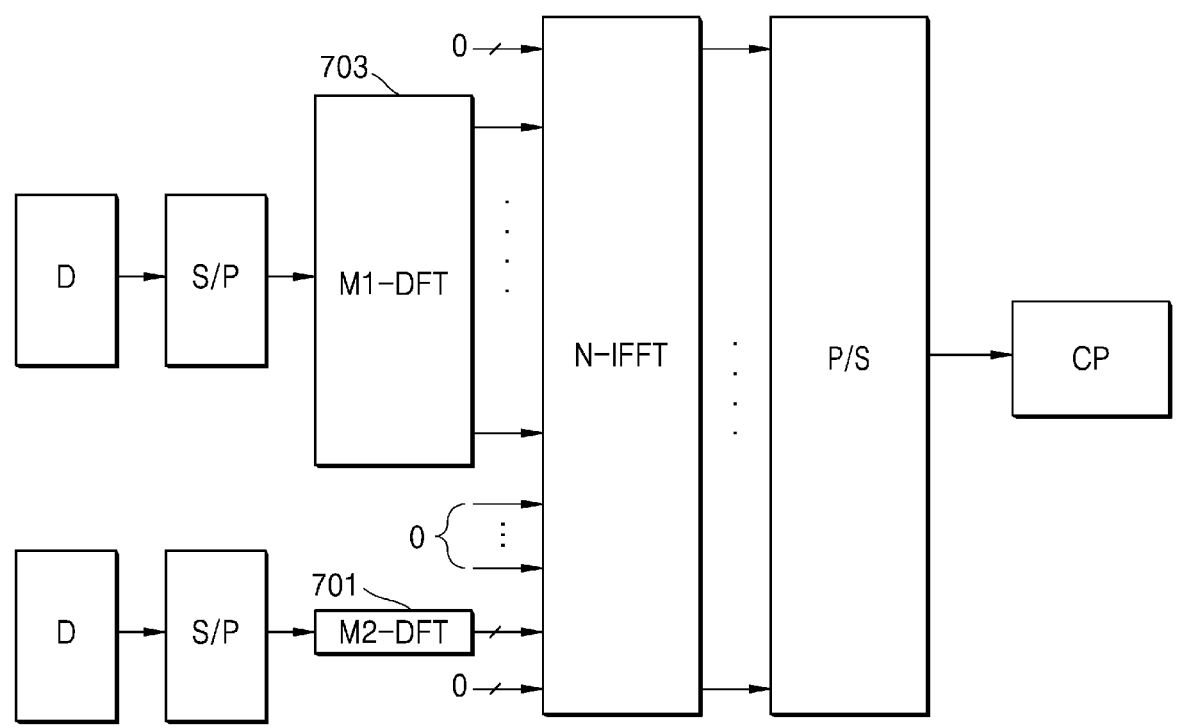
FIG. 7A is a diagram illustrating a data symbol transmitting method according to a sixth embodiment of the disclosure.
Figure 7B:
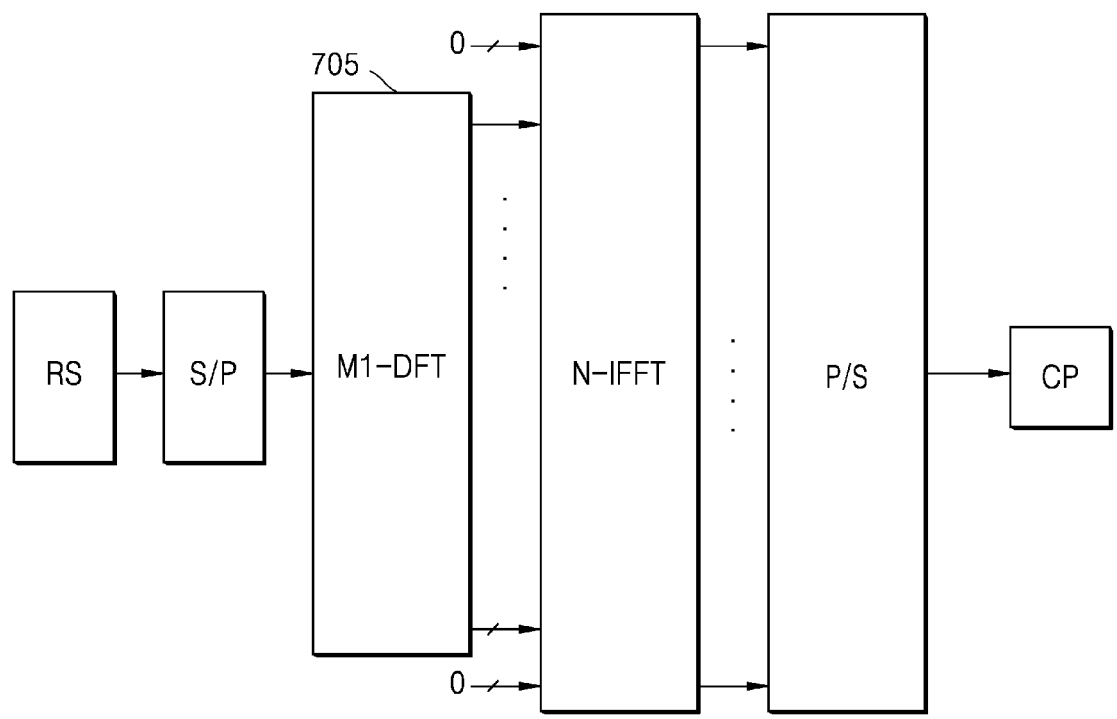
FIG. 7B is a diagram illustrating an RS symbol transmitting method according to the sixth embodiment of the disclosure.
Figure 7C:
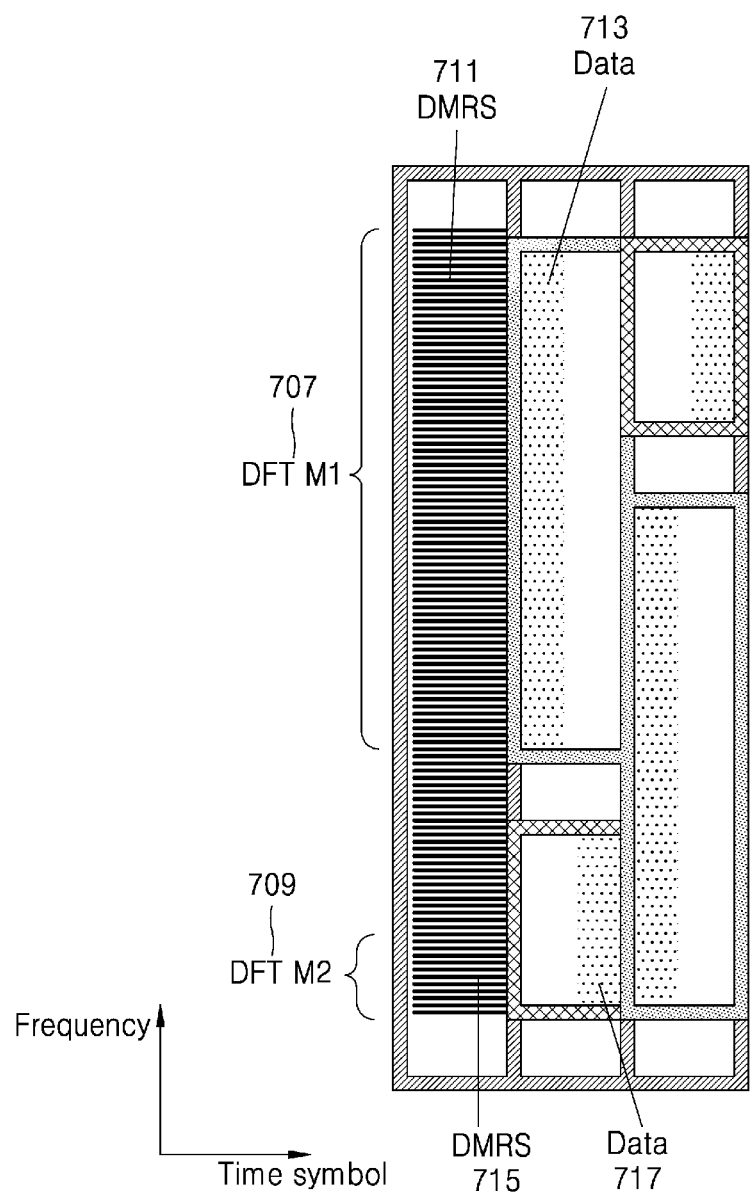
FIG. 7C is a diagram illustrating an RS transmitting method according to the sixth embodiment of the disclosure.

FIG. 7A is a diagram illustrating a data symbol transmitting method according to the sixth embodiment of the disclosure, FIG. 7B is a diagram illustrating an RS symbol transmitting method according to the sixth embodiment of the disclosure, and FIG. 7C is a diagram illustrating an RS transmitting method according to the sixth embodiment of the disclosure.

Referring to FIGS. 7A, 7B, and 7C, the BS may transmit data to each of UE 1 and UE 2 by using an M1 DFT precoder 701 and an M2 DFT precoder 703. Here, in order to transmit an RS for data channel reception by UE 1 and UE 2, the BS may transmit the RS by using a M3-length DFT precoder 705. In this case, as in reference numeral 707, UEs may share the RS over a wideband. However, in a case of a data channel, as in reference numeral 713 and reference numeral 717, the data channel may be transmitted in a part of a band occupied by M3. For an increase in reception performance with respect to the data channel, a band occupied by M1 and M2 may be transmitted via movement, hopping, mirroring, or a combination thereof among symbols, slots, or retransmission within M3. The disclosed sixth embodiment is useful for UEs having similar channel characteristics or UEs using a same beam, and according to the disclosed sixth embodiment, the BS may decrease an overhead of a resource used for an RS.

[Seventh Embodiment] (Case where the BS Uses One DFT Precoder for a PDSCH, and Divides a DFT Precoder with Respect to a Frequency and Uses them for a DMRS)

The seventh embodiment of the disclosure relates to a method by which, when the BS transmits a PDSCH by using one SC band, the BS divides the SC band of the PDSCH into one or more SC bands and transmits a DMRS. When a size of a DFT precoder used for data is M1, the BS may indicate, via higher layer signaling, a UE with the number of parallel DFT precoders to be used in transmission of an RS.

Figure 8A:
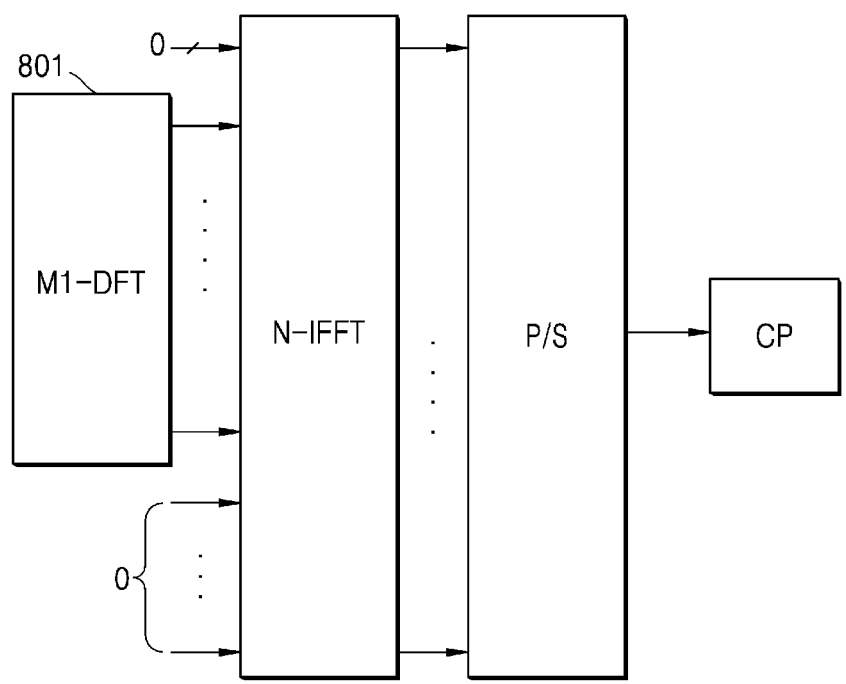
FIG. 8A is a diagram illustrating a data symbol transmitting method according to a seventh embodiment of the disclosure.
Figure 8B:
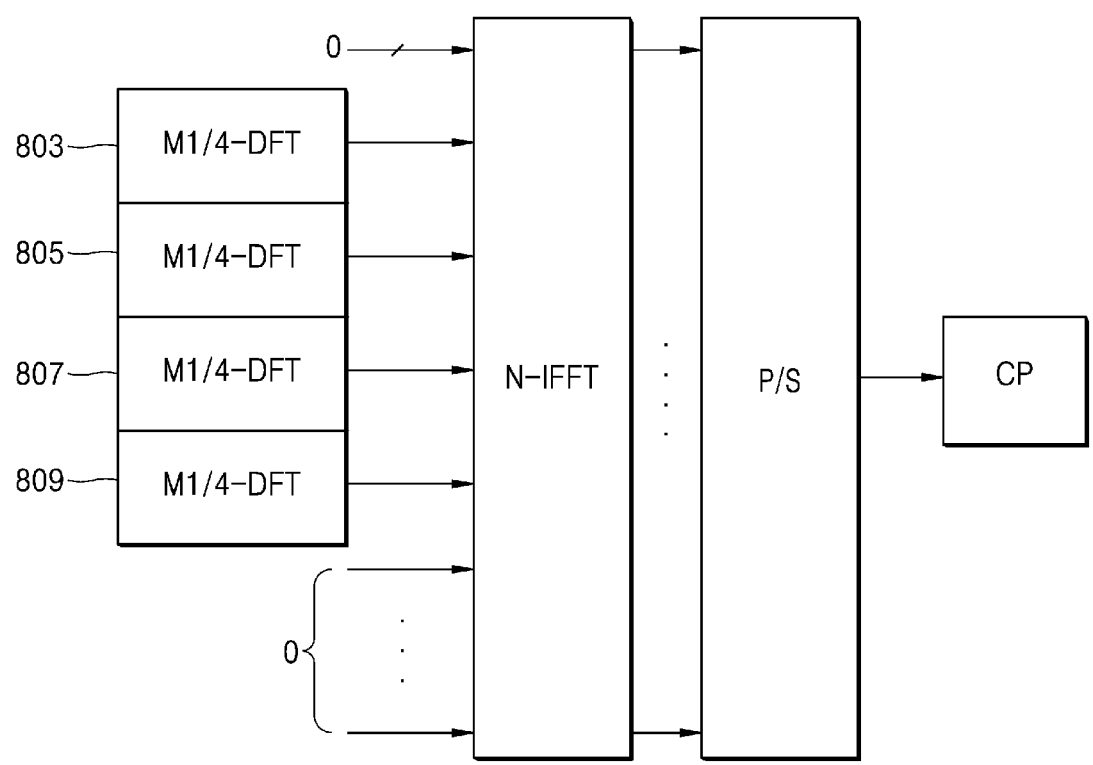
FIG. 8B is a diagram illustrating an RS symbol transmitting method according to the seventh embodiment of the disclosure.
Figure 8C:
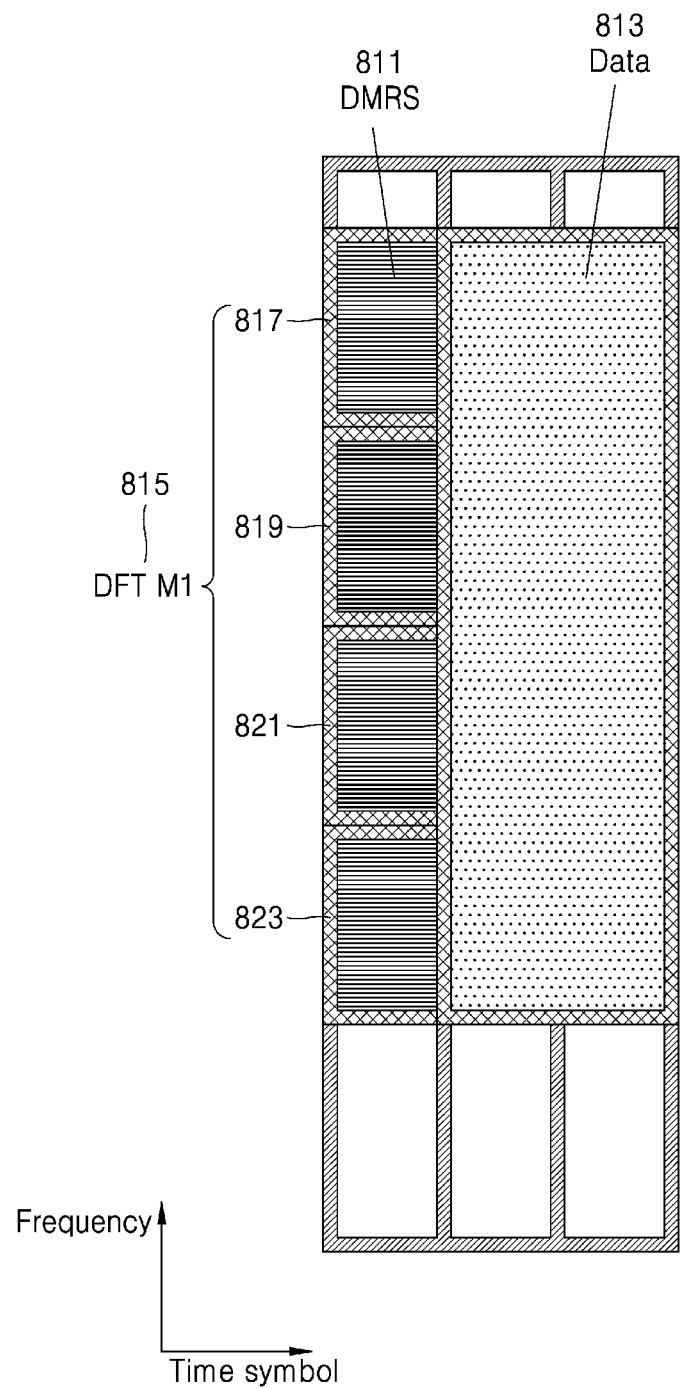
FIG. 8C is a diagram illustrating an RS transmitting method according to the seventh embodiment of the disclosure.

FIG. 8A is a diagram illustrating a data symbol transmitting method according to the seventh embodiment of the disclosure, FIG. 8B is a diagram illustrating an RS symbol transmitting method according to the seventh embodiment of the disclosure, and FIG. 8C is a diagram illustrating an RS transmitting method according to the seventh embodiment of the disclosure.

Referring to FIGS. 8A, 8B, and 8C, the BS may parallel use M1/4-DFT precoders 803, 805, 807, and 809, which are quartered, so as to use a DFT precoder in transmission of an RS to the UE, the DFT precoder having a same length as an M1-DFT precoder 801 used for a data channel. In this case, an RS 811 is transmitted in different frequency bands 817, 819, 821, and 823 respectively for the M1/4-DFT precoders 803, 805, 807, and 809, such that channel estimation performance is further improved than RS transmission in which the M1-DFT precoder 801 is co-used with the data channel. According to the seventh embodiment of the disclosure, the UE may further correctly receive channel information based on an SC band.

Figure 9:
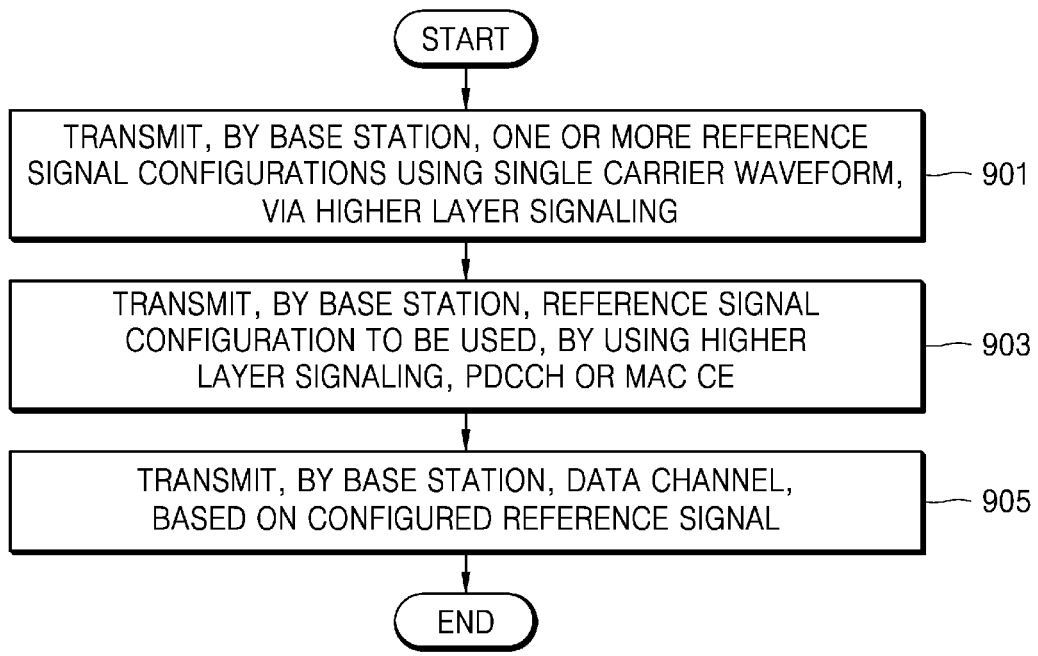
FIG. 9 is a diagram of an operation in which the BS transmits an RS by using a single carrier (SC) according to an embodiment of the disclosure.

FIG. 9 is a diagram of an operation in which the BS transmits an RS by using a SC according to an embodiment of the disclosure.

Referring to FIG. 9, in operation 901, the BS transmits, via higher layer signaling, one or more RS configurations to a UE so as to transmit an RS using a SCW.

In operation 903, the BS transmits, via higher layer signaling, PDCCH or MAC CE, an RS configuration to be used in actual transmission.

In operation 905, the BS transmits a data channel, based on a configured RS.

In an embodiment, the BS may dynamically determine an RS configuration to be used in actual transmission. In more detail, the BS may determine an RS configuration to be used in actual transmission, based on a reference signal received power (RSRP), a signal-to-noise ratio (SNR), rank information, and the like. Also, the BS may statically determine an RS configuration to be used in actual transmission. In more detail, the BS may determine a preset RS configuration as RS configuration to be used in actual transmission. Here, the BS may determine the RS configuration to be used in actual transmission, without channel estimation.

Figure 10:
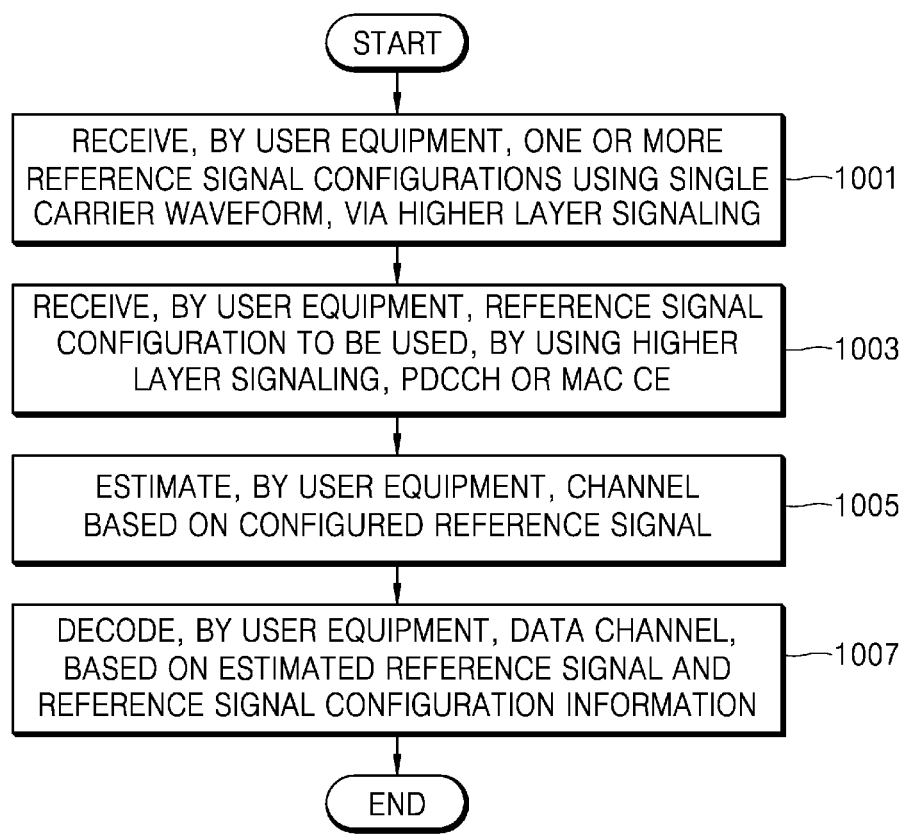
FIG. 10 is a diagram of an operation in which a UE receives an RS by using a SC according to an embodiment of the disclosure.

FIG. 10 is a diagram of an operation in which a UE receives an RS by using a SC according to an embodiment of the disclosure.

Referring to FIG. 10, in operation 1001, the UE receives, via higher layer signaling, one or more RS configurations so as to receive an RS using a SCW.

In operation 1003, the UE receives, via higher layer signaling, PDCCH or MAC CE, an RS configuration to be used in data transmission.

In operation 1005, the UE estimates a channel based on a configured RS.

In operation 1007, the UE receives and decodes a data channel, based on the estimated RS and RS configuration information.

Figure 11:
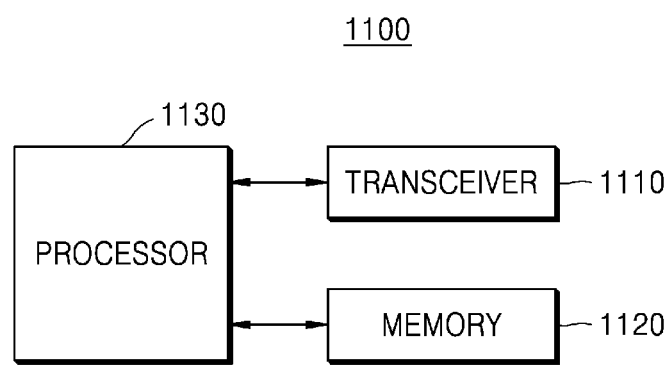
FIG. 11 is a diagram illustrating a BS according to an embodiment of the disclosure.

FIG. 11 is a diagram illustrating a BS enabled to perform the invention according to an embodiment of the disclosure.

As illustrated in FIG. 11, the BS of the disclosure may include a transceiver 1110, a memory 1210, and a processor 1130. According to the afore-described communication method by the BS, the processor 1130, the transceiver 1110, and the memory 1120 may operate. However, elements of the BS are not limited to the above example. For example, the BS may include more elements than the aforementioned elements or may include fewer elements than the aforementioned elements. Furthermore, the processor 1130, the transceiver 1110, and the memory 1120 may be implemented as one chip. Also, the processor 1130 may refer to one or more processors.

A receiver of the BS and a transmitter of the BS may be collectively referred to as the transceiver 1110, and the transceiver 1110 may transmit or receive a signal to or from the BS. The signal transmitted to or received from the BS may include control information and data. To this end, the transceiver 1110 may include a RF transmitter for up-converting and amplifying a frequency of signals to be transmitted, and an RF receiver for low-noise-amplifying and down-converting a frequency of received signals. However, this is merely an example of the transceiver 1110, and thus elements of the transceiver 1110 are not limited to the RF transmitter and the RF receiver.

Also, the transceiver 1110 may receive signals through wireless channels and output the signals to the processor 1130, and may transmit signals output from the processor 1130, through wireless channels.

The memory 1120 may store programs and data necessary for operations of the BS. Also, the memory 1120 may store control information or data which are included in a signal obtained by the BS. The memory 1120 may be implemented as a storage medium including a ROM, a RAM, a hard disk, a CD-ROM, a DVD, or the like, or any combination thereof.

The processor 1130 may control a series of processes to allow the BS to operate according to the aforementioned embodiments of the disclosure.

Figure 12:
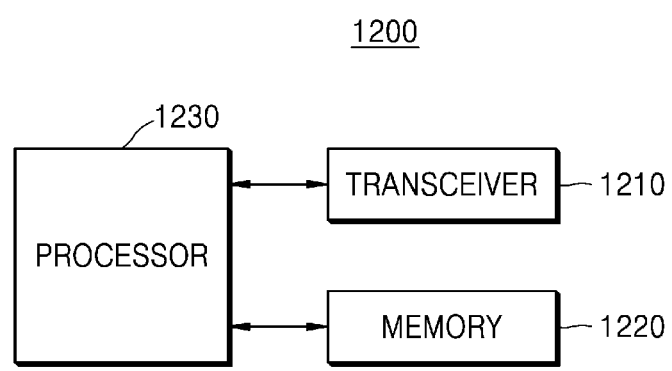
FIG. 12 is a diagram illustrating a UE according to an embodiment of the disclosure.

FIG. 12 is a diagram illustrating a UE enabled to perform the invention according to an embodiment of the disclosure.

As illustrated in FIG. 12, the UE of the disclosure may include a transceiver 1210, a memory 1220, and a processor 1230. The processor 1230, the transceiver 1210, and the memory 1220 of the UE may operate according to the aforementioned communication schemes of the UE. However, elements of the UE are not limited to the above example. For example, the UE may include more elements than the aforementioned elements or may include fewer elements than the aforementioned elements. The processor 1230, the transceiver 1210, and the memory 1220 may be implemented as one chip. Also, the processor 1230 may refer to one or more processors.

A receiver of the UE and a transmitter of the UE may be collectively referred to as the transceiver 1210, and the transceiver 1210 may transmit or receive a signal to or from the BS. The signal transmitted to or received from the BS may include control information and data. To this end, the transceiver 1210 may include a RF transmitter for up-converting and amplifying a frequency of signals to be transmitted, and an RF receiver for low-noise-amplifying and down-converting a frequency of received signals. However, this is merely an example of the transceiver 1210, and thus elements of the transceiver 1210 are not limited to the RF transmitter and the RF receiver.

Also, the transceiver 1210 may receive signals through wireless channels and output the signals to the processor 1230, and may transmit signals output from the processor 1230, through wireless channels.

The memory 1220 may store programs and data necessary for operations of the UE. Also, the memory 1220 may store control information or data which are included in a signal obtained by the UE. The memory 1220 may be implemented as a storage medium including a ROM, a RAM, a hard disk, a CD-ROM, a DVD, or the like, or any combination thereof.

The processor 1230 may control a series of processes to allow the UE to operate according to the aforementioned embodiments of the disclosure.

The methods according to the embodiments of the disclosure as described herein or in the following claims may be implemented as hardware, software, or a combination of hardware and software.

When implemented as software, a computer-readable storage medium or a computer program product which stores one or more programs (e.g., software modules) may be provided. The one or more programs, which are stored in the computer-readable storage medium or the computer program product, are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the above particular embodiments of the disclosure, the elements included in the disclosure are expressed in the singular or plural according to the presented particular embodiments of the disclosure. However, the singular or plural expressions are selected suitably according to the presented situations for convenience of descriptions, the disclosure is not limited to the singular or plural elements, and the elements expressed in the plural may even be configured in the singular or the elements expressed in the singular may even be configured in the plural.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, portions of an embodiment of the disclosure are combined with portions of another embodiment of the disclosure. The embodiments of the disclosure may also be applied to other communication systems such as an LTE system, a 5G or NR system, or the like, and various modifications based on the technical concept of the embodiments of the disclosure may be made.

The invention claimed is:

1. An operating method of a base station (BS) in a wireless communication system, the operating method comprising:
    transmitting, to a user equipment (UE), via higher layer signaling, one or more reference signal configurations for receiving a reference signal from the BS to the UE by using a single carrier band, wherein the one or more reference signal configurations comprise at least one of one or more symbol positions of the reference signal, a subcarrier spacing of the reference signal or a sequence type of the reference signal;

transmitting, to the UE, information about a reference signal configuration to be used for the UE from among the one or more reference signal configurations, via at least one of the higher layer signaling, a physical downlink control channel (PDCCH), or a media access control control element (MAC CE); and transmitting, to the UE, the reference signal via a data channel, based on the information about the reference signal configuration to be used for the UE.

2. The operating method of claim 1, wherein the one or more reference signal configurations comprise at least one of:
   a first reference signal configuration for configuring a subcarrier spacing used in transmission of the reference signal to be different from a subcarrier spacing used in transmission of the data channel, or
   a second reference signal configuration for transmitting a reference signal on which discrete Fourier transform (DFT) precoding is performed or a reference signal on which sample multiplexing is performed, based on a transmission bandwidth of the data channel, or
   a third reference signal configuration for transmitting the reference signal by using a single carrier band having a bandwidth equal to or greater than a bandwidth of a plurality of single carrier bands when a plurality of data channels respectively corresponding to the plurality of single carrier bands are transmitted by using the plurality of single carrier bands.

3. The operating method of claim 1, wherein the one or more reference signal configurations comprise at least one of:
   a fourth reference signal configuration for transmitting the reference signal in a first band comprising a plurality of bands for transmitting respective data channels to a plurality of UEs, or
   a fifth reference signal configuration for transmitting a data channel by using a second band, and transmitting the reference signal in bands divided from the second band.

4. The operating method of claim 1, wherein the transmitting, to the UE, the information about the reference signal configuration to be used for the UE from among the one or more reference signal configurations comprises determining the reference signal configuration to be used for the UE, based on at least one of a number of single carrier bands, a channel quality, whether transmission of the data channel is succeeded, or a number of UEs to which the data channel is to be transmitted.

5. The operating method of claim 1, wherein the transmitting, to the UE, of the information about the reference signal configuration to be used for the UE from among the one or more reference signal configurations comprises determining the reference signal configuration to be used for the UE, based on at least one of a reference signal received power (RSRP), a signal-to-noise ratio (SNR), or a rank, or determining to use a pre-configured reference signal configuration.

6. An operating method of a user equipment (UE) in a wireless communication system, the operating method comprising:
   receiving, from a base station (BS), via higher layer signaling, one or more reference signal configurations for receiving a reference signal from the BS to the UE by using a single carrier band, wherein the one or more reference signal configurations comprise at least one of one or more symbol positions of the reference signal, a subcarrier spacing of the reference signal or a sequence type of the reference signal;

receiving, from the BS, information about a reference signal configuration to be used for the UE from among the one or more reference signal configurations, via at least one of the higher layer signaling, a physical downlink control channel (PDCCH), or a media access control control element (MAC CE); and receiving, from the BS, the reference signal via a data channel, based on the information about the reference signal configuration to be used for the UE.

7. The operating method of claim 6, wherein the one or more reference signal configurations comprise at least one of:
   a first reference signal configuration for configuring a subcarrier spacing used in reception of the reference signal to be different from a subcarrier spacing used in reception of the data channel,
   a second reference signal configuration for receiving a reference signal on which discrete Fourier transform (DFT) precoding is performed or a reference signal on which sample multiplexing is performed, based on a transmission bandwidth of the data channel, or
   a third reference signal configuration for receiving the reference signal by using a single carrier band having a bandwidth equal to or greater than a bandwidth of a plurality of single carrier bands when a plurality of data channels respectively corresponding to the plurality of single carrier bands are received by using the plurality of single carrier bands.

8. The operating method of claim 6, wherein the one or more reference signal configurations comprise at least one of:
   a fourth reference signal configuration for receiving the reference signal in a first band comprising a plurality of bands for receiving respective data channels by a plurality of UEs, or
   a fifth reference signal configuration for receiving a data channel by using a second band, and receiving the reference signal in bands divided from the second band.

9. The operating method of claim 6, wherein the reference signal configuration to be used for the UE is determined, based on at least one of a number of single carrier bands, a channel quality, whether transmission of the data channel is succeeded, or a number of UEs to which the data channel is to be transmitted.

10. The operating method of claim 6, wherein the receiving, from the BS, of the reference signal via the data channel comprises:
   receiving a reference signal, based on the information about the reference signal configuration to be used for the UE;
   performing channel estimation, based on the received reference signal; and
   decoding the data channel, based on a result of the channel estimation and the information about the reference signal configuration to be used for the UE.

11. A base station (BS) in a wireless communication system, the BS comprising:
   a communicator;
   at least one memory comprising an instruction; and
   at least one processor coupled with the communicator and configured to execute the instruction to control the BS to:
   transmit, to a user equipment (UE), via higher layer signaling, one or more reference signal configurations for receiving a reference signal from the BS to the UE by using a single carrier band, wherein the one or more reference signal configurations comprise at least one of one or more symbol positions of the reference signal, a subcarrier spacing of the reference signal or a sequence type of the reference signal, transmit, to the UE, information about a reference signal configuration to be used for the UE from among the one or more reference signal configurations, via at least one of the higher layer signaling, a physical downlink control channel (PDCCH), or a media access control control element (MAC CE), and transmit, to the UE, the reference signal via a data channel, based on the information about the reference signal configuration to be used for the UE.

12. The BS of claim 11, wherein the one or more reference signal configurations comprise at least one of:

a first reference signal configuration for configuring a subcarrier spacing used in transmission of the reference signal to be different from a subcarrier spacing used in transmission of the data channel, a second reference signal configuration for transmitting a reference signal on which discrete Fourier transform (DFT) precoding is performed or a reference signal on which sample multiplexing is performed, based on a transmission bandwidth of the data channel, or a third reference signal configuration for transmitting the reference signal by using a single carrier band having a bandwidth equal to or greater than a bandwidth of a plurality of single carrier bands when a plurality of data channels respectively corresponding to the plurality of single carrier bands are transmitted by using the plurality of single carrier bands.

13. The BS of claim 11, wherein the one or more reference signal configurations comprise at least one of:

a fourth reference signal configuration for transmitting the reference signal in a first band comprising a plurality of bands for transmitting respective data channels to a plurality of UEs, or a fifth reference signal configuration for transmitting a data channel by using a second band, and transmitting the reference signal in bands divided from the second band.

14. The BS of claim 11, wherein the at least one processor is configured to determine the reference signal configuration to be used for the UE, based on at least one of a number of single carrier bands, a channel quality, whether transmission of the data channel is succeeded, or a number of UEs to which the data channel is to be transmitted.

15. The BS of claim 11, wherein the at least one processor is configured to determine the reference signal configuration to be used for the UE, based on at least one of a reference signal received power (RSRP), a signal-to-noise ratio (SNR), or a rank, or determining to use a pre-configured reference signal configuration.

* * * * *